United States Patent [19]

Haibt et al.

[11] 4,007,450
[45] Feb. 8, 1977

[54] DATA SHARING COMPUTER NETWORK

[75] Inventors: Luther Harold Haibt, Katonah; Alvin Paul Mullery, Chappaqua, both of N.Y.

[73] Assignee: International Business Machines Corporation, Armonk, N.Y.

[22] Filed: June 30, 1975

[21] Appl. No.: 591,993

[52] U.S. Cl. .......................................... 340/172.5
[51] Int. Cl.² ........................................ G06F 15/16
[58] Field of Search ............ 340/172.5; 179/15 AL

[56] References Cited

UNITED STATES PATENTS

| | | | |
|---|---|---|---|
| 3,212,980 | 6/1960 | Griffith et al. | 340/172.5 |
| 3,238,506 | 6/1961 | Jung et al. | 340/172.5 |
| 3,312,954 | 4/1962 | Bible et al. | 340/172.5 |
| 3,659,271 | 4/1972 | Collins et al. | 340/172.5 |
| 3,699,529 | 10/1972 | Beyers | 340/172.5 |
| 3,748,647 | 7/1973 | Ashany | 340/172.5 |
| 3,749,845 | 7/1973 | Fraser | 179/15 AL |
| 3,755,789 | 8/1973 | Collins | 340/172.5 |
| 3,806,885 | 4/1974 | Moore | 340/172.5 |
| 3,879,582 | 4/1975 | White et al. | 179/15 AL |
| 3,879,710 | 4/1975 | Maxemchuk et al. | 340/172.5 |

*Primary Examiner*—Raulfe B. Zache
*Attorney, Agent, or Firm*—Robert E. Sandt

[57] ABSTRACT

A data communication network having a plurality of nodes interconnected with a communication link, wherein each node shares given ones of its data sets in common with other nodes in the network, and each node is operative to update any shared data set, except if one of the other nodes is also seeking to update the same data set, in which case the node having the higher priority prevails. Each node has a memory which stores the node location of each shared data set and the updating priority which each node has with respect to each respective set of shared data. A node receiving competing requests for update will access this memory and, depending upon the sequence of the requests, may accept a higher priority request and refuse a lower priority request.

13 Claims, 29 Drawing Figures

FIG. 3

| FIG. 3A | FIG. 3B | FIG. 3E | FIG. 3F |
|---|---|---|---|
| FIG. 3C | FIG. 3D | FIG. 3G | FIG. 3H |
| | | FIG. 3I | FIG. 3J |
| | | FIG. 3K | FIG. 3L |
| | | FIG. 3M | FIG. 3N |
| | | FIG. 3O | FIG. 3P |
| | | FIG. 3Q | FIG. 3R |
| | | FIG. 3S | FIG. 3T |
| | | FIG. 3U | FIG. 3V |
| | | FIG. 3W | FIG. 3X |
| | | FIG. 3Y | FIG. 3Z |

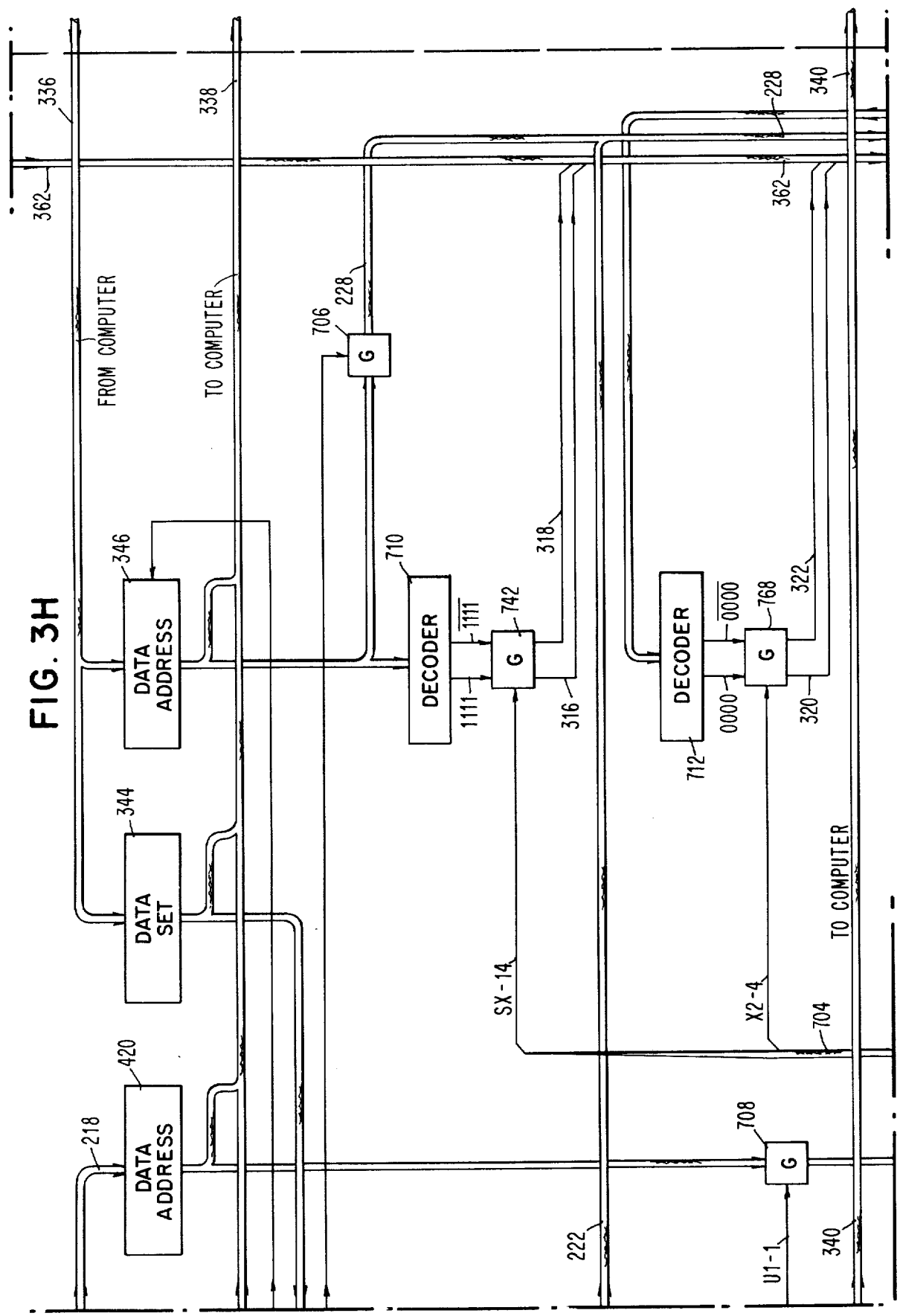

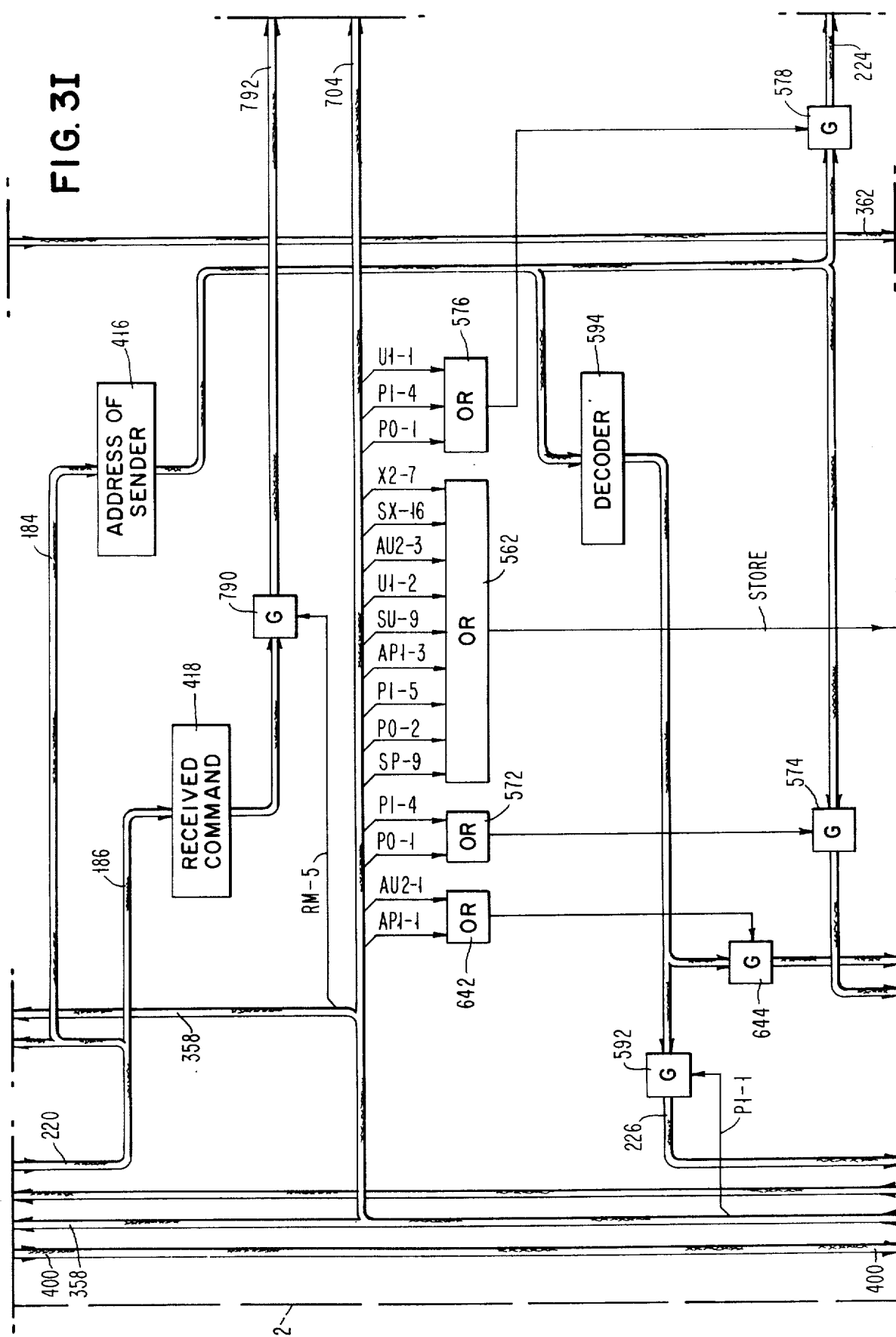

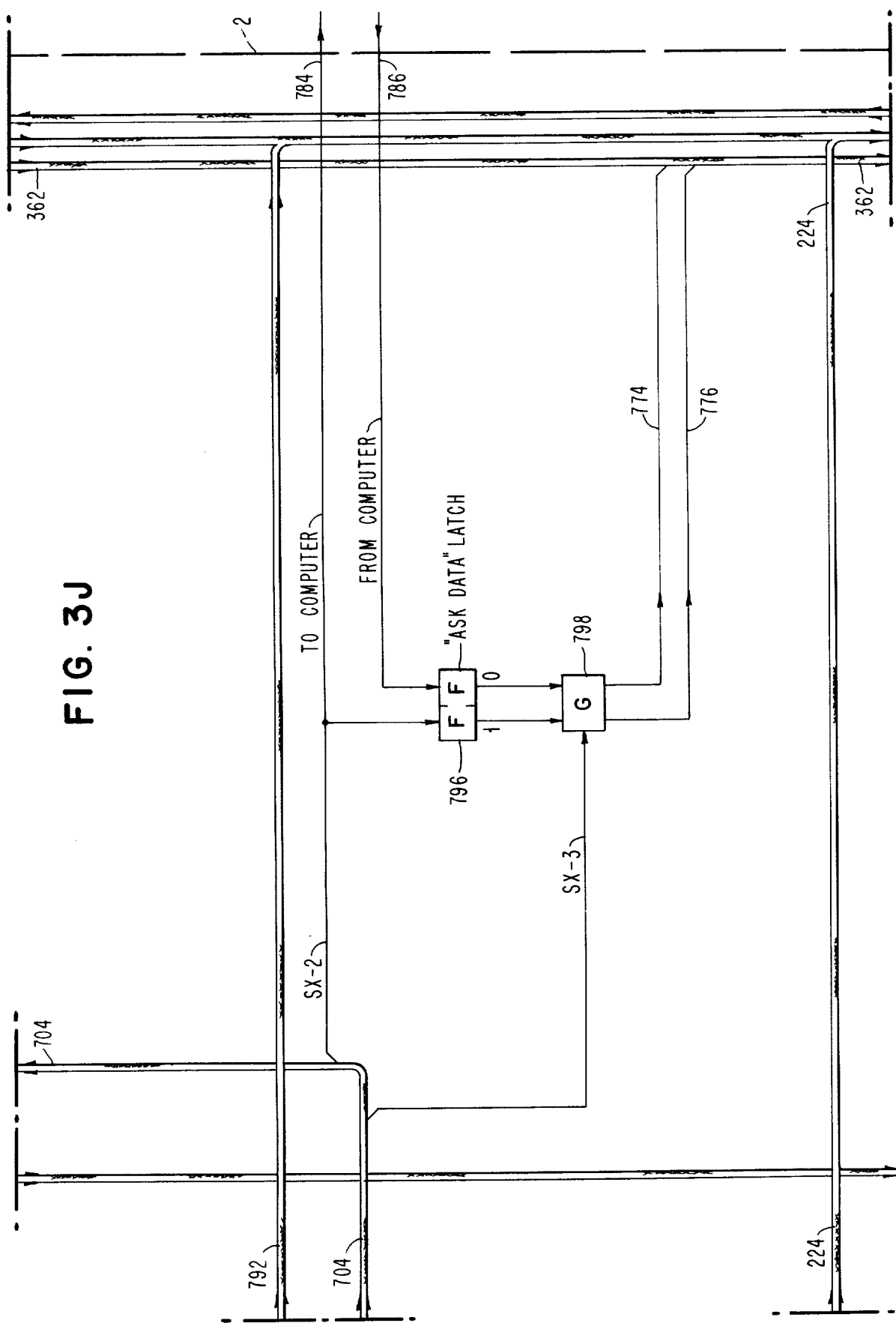

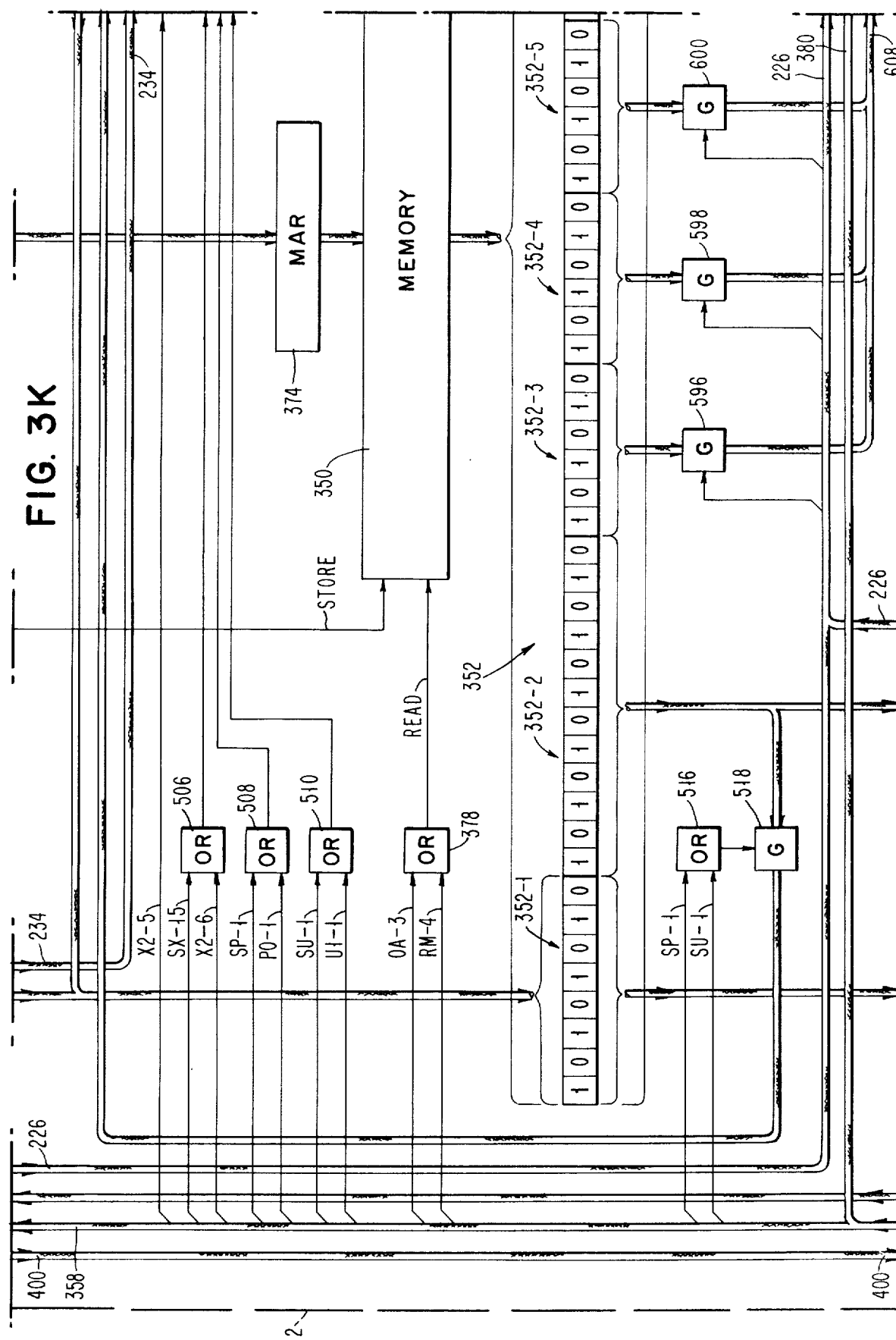

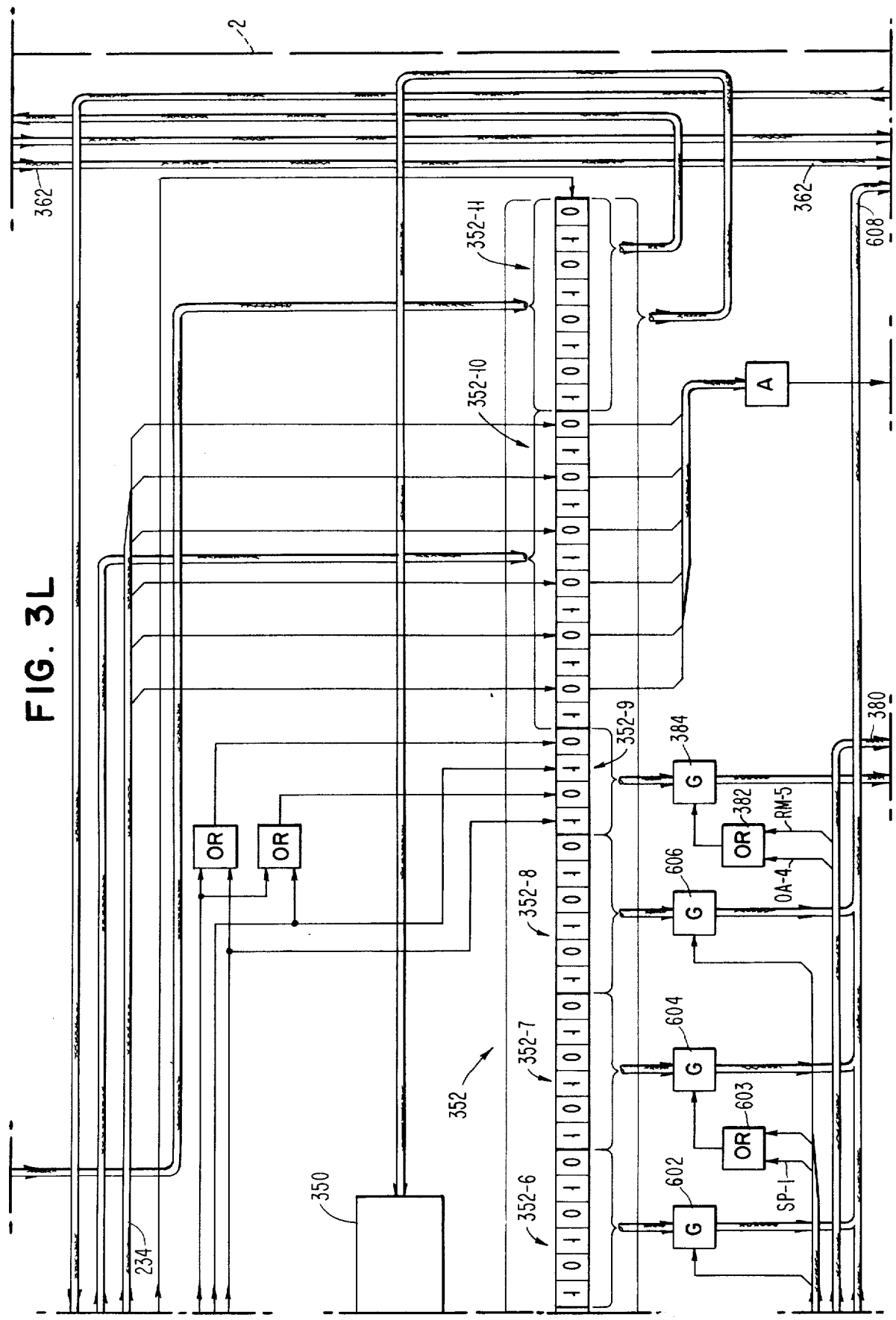

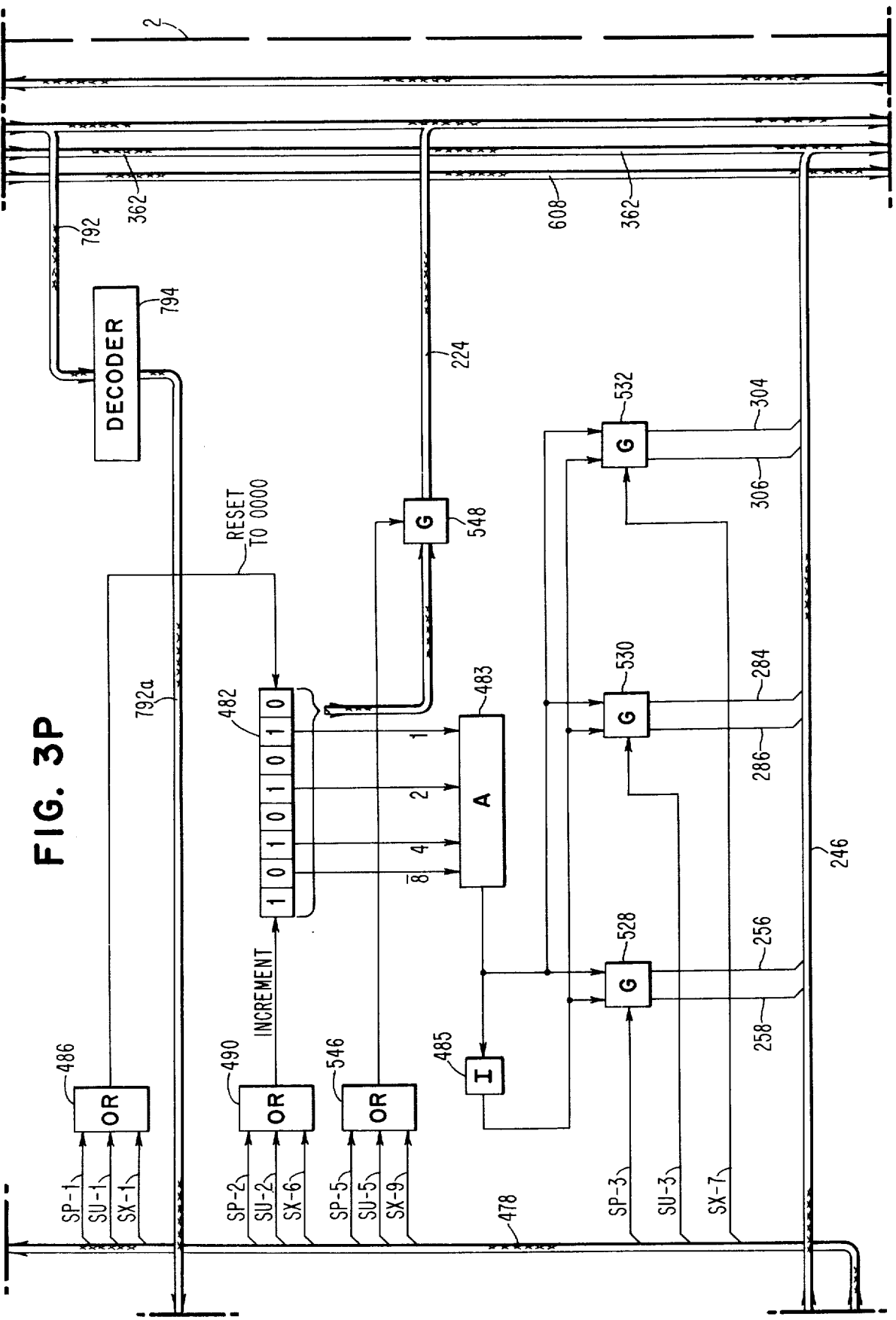

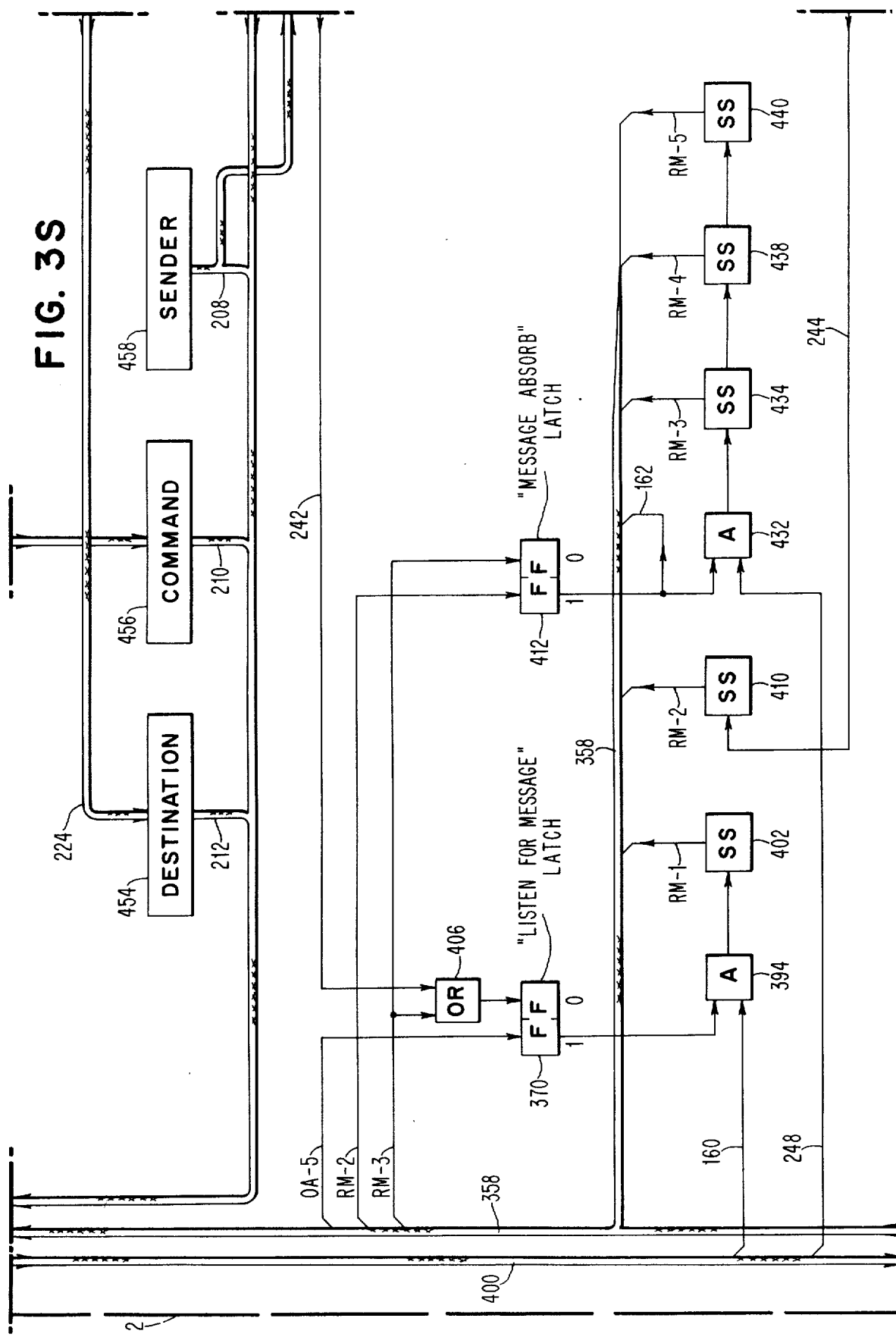

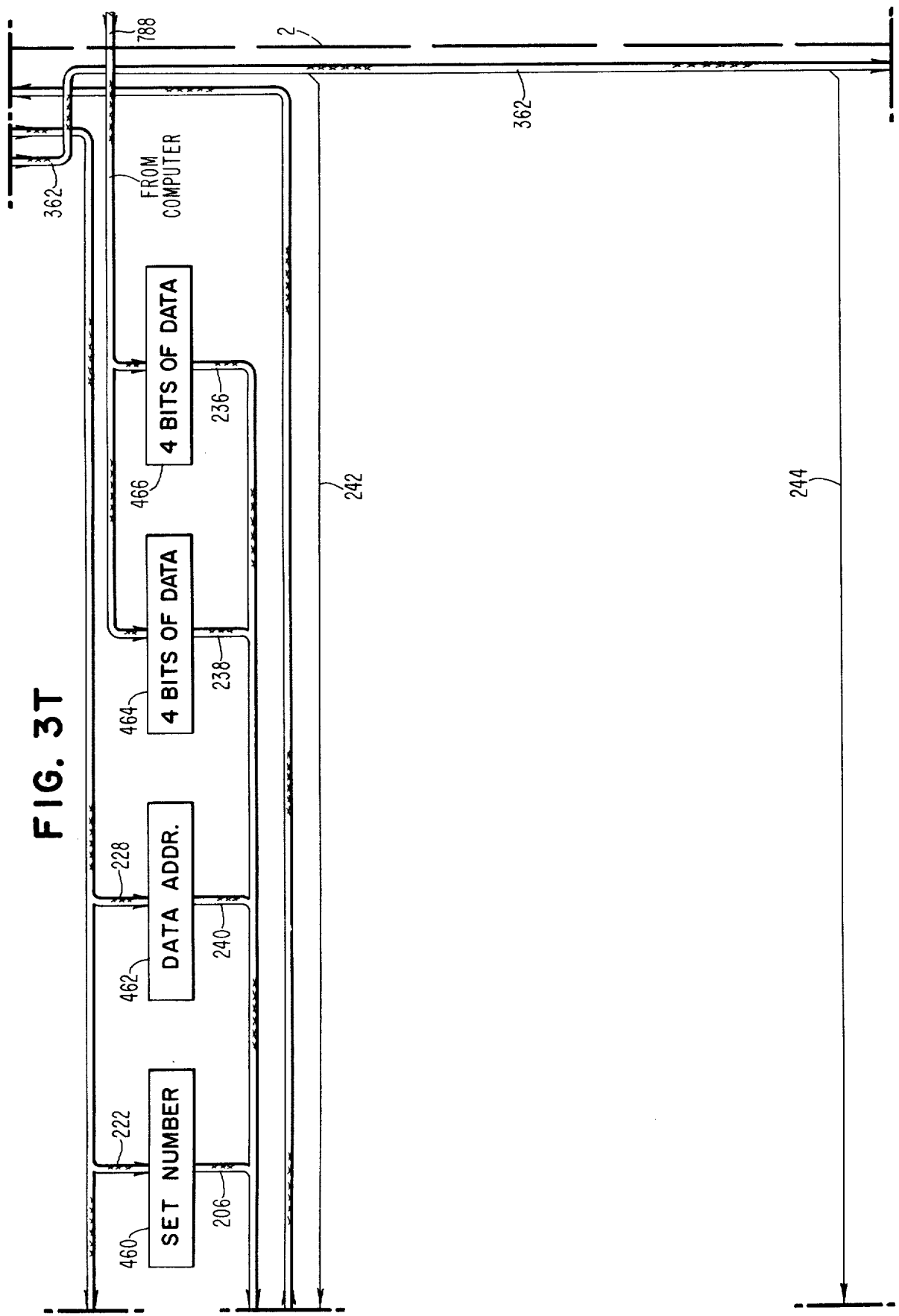

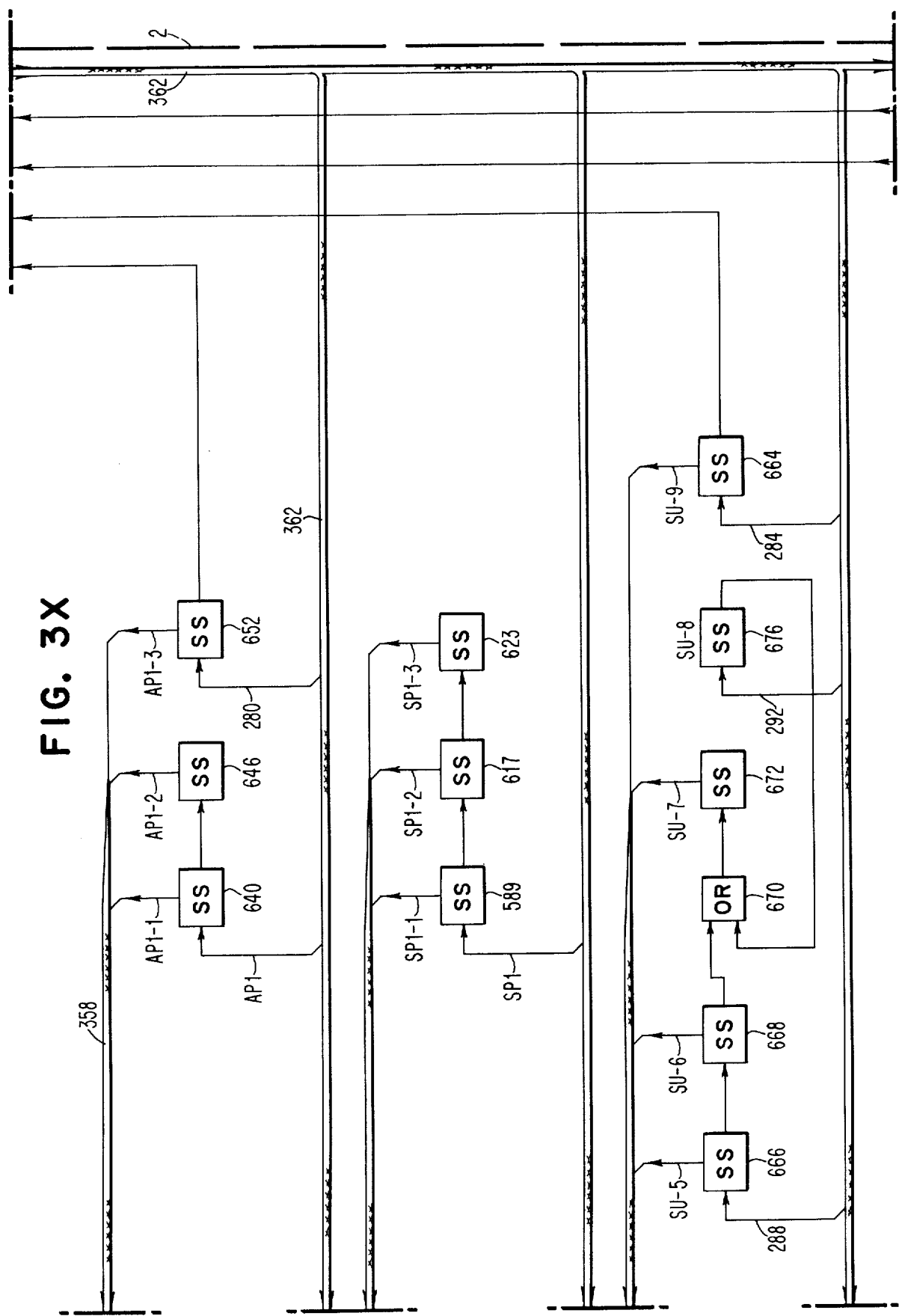

DATA SHARING COMPUTER NETWORK

FIELD OF THE INVENTION

This invention relates to data processing systems and more particularly to means for interconnecting a plurality of computers into a network wherein each computer shares certain of its data sets in common with other computers in the network and each node in the network can initiate or receive the updating of shared data and resolve conflicts among nodes competing to update the same data.

DESCRIPTION OF THE PRIOR ART

Networks of computers interconnected by a communication link are known. So, too, is it known for a computer in a network to share data in common with other computers in the network so that each computer may have rapid access to frequently used data. In these prior art systems, a central housekeeping facility was given the task of insuring that all the shared data was current and supervising the updating of the data in the satellite units.

The instant invention relies on the same principles of shared data, or distributed multiple copies, to give efficient access to frequently used data. It differs from prior art systems in that the control of updating is distributed among the several computer nodes sharing the data. Therefore, each node in the network can act as either a master or a slave in the updating of a shared data set. Each unit, as to each respective shared data set, has local stored information defining the priority of each node so that it can resolve conflicts between itself and any other node, or conflicts between two other nodes both competing to be the master of this slave unit.

SUMMARY OF THE INVENTION

It is therefore an object of this invention to provide means in a data communication network, comprising a plurality of nodes, each of which has associated therewith a computer storing sets of data in common with predetermined ones of the computers associated with other nodes in the network, for controlling the updating of the data sets shared by the computers, and for resolving conflicts among a plurality of nodes competing to update the same shared data set.

A further object of the invention is to provide means at each of the nodes in a data communication network for storing the node location of each set of data shared in common by a plurality of nodes, for manifesting the priority each node has for updating each respective shared data set, and for resolving conflicts between nodes seeking to update the same data set in accordance with the stored priorities.

The foregoing and other objects, features, and advantages of the present invention will be apparent from the following more particular description of a preferred embodiment of the invention as illustrated in the accompanying drawings.

DESCRIPTION OF A PREFERRED EMBODIMENT

Overall Arrangement and Message Format

Figure 1:
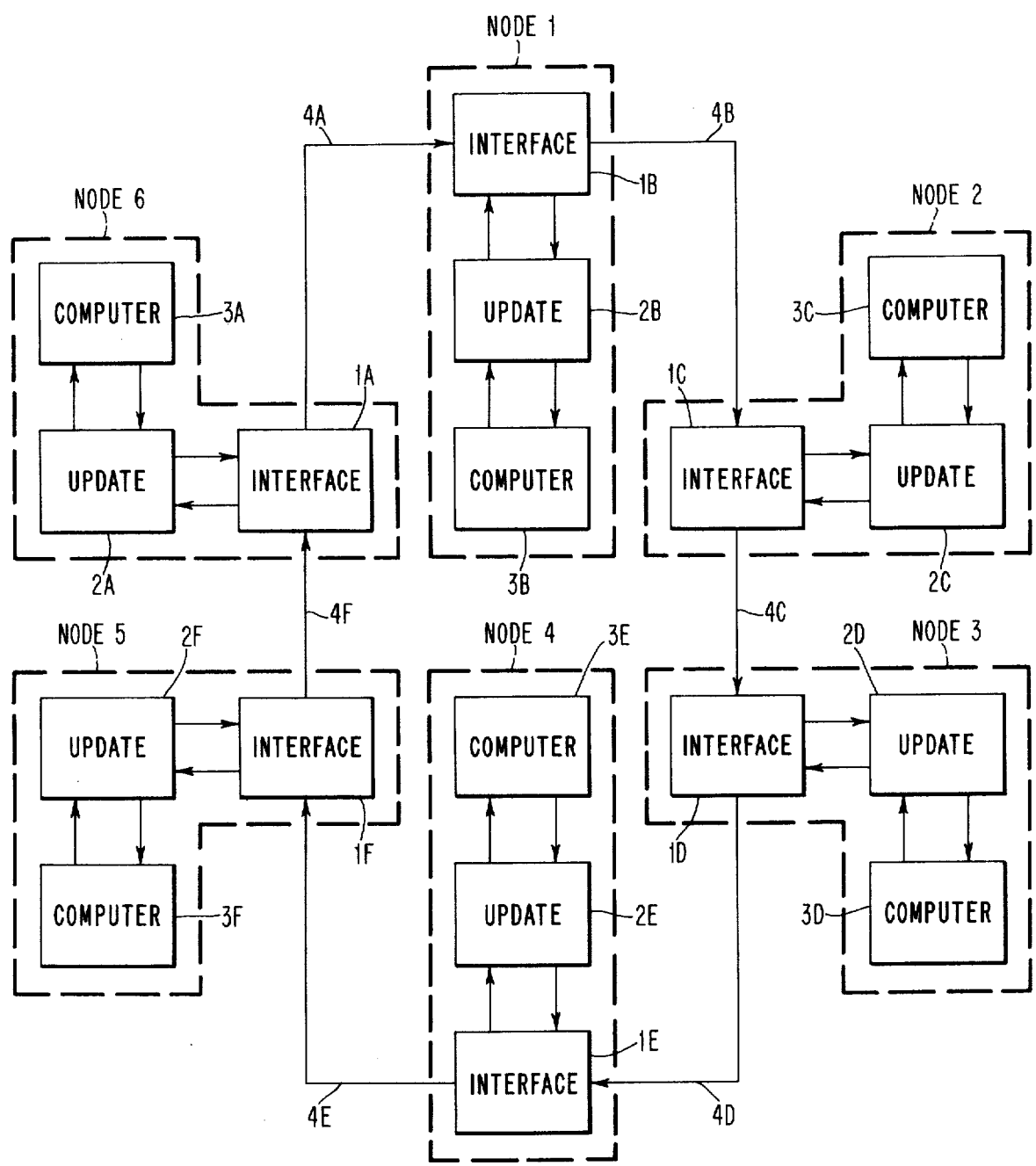
FIG. 1 is a block diagram illustrating the bulk deployment of the nodal units.

FIG. 1 shows the overall arrangement of the nodes in the data communication network. In the illustrative embodiment, six nodes have been arbitrarily chosen as representative of a system that can be expanded at will.

Each of the nodes includes an interface unit 1A through 1F, an update unit 2A through 2F, and a computer 3A through 3F. A separate communication link 4A through 4F connects the interface unit at each node to the interface unit in the next succeeding node to form a closed loop network. Each communication link in the preferred embodiment consists of four wires, as messages are transmitted parallel by bit serially by character. The communication link could also be a radio link, optical link, and could employ any one of the conventional communication expedients for discriminating between bits and characters.

Any node has the capability of inserting a message into the line leading from the node or absorbing a message from the line leading into the node. Actually, all messages coming into a node enter the interface unit and are either absorbed from there into the update unit or pass out of the interface unit to the outgoing line. Thus, a message can conceivably circulate through several trips around the loop until a node is prepared to receive it.

All messages are initiated within the update unit and are inserted into the interface unit and the outgoing line when a blank message slot is found on the line. Therefore, before going into any further details of the node structure, it is expedient to pause and explain the message format.

Each message consists of eight four-bit characters transmitted parallel by bit, serially by character. Each message is structured as follows:

| Character | Description |
|---|---|
| C1 | Beginning of Message = 1111 |
| C2 | Destination (0000 = blank message) |
| C3 | Command |
| C4 | Address of Sender (1 to 6 in Binary) |
| C5 | Data Set No. |
| C6 | Data Address (Address of Byte) |
| C7 | First 4 bits of data) |
| C8 | Second 4 bits of data) ~ 1 *byte* |

A complete data set consists of 16 bytes of eight bits each. Updating of a complete data set thus requires sixteen messages plus four for each node to be addressed. Thus, for example, if node A were to command nodes B and C to update a complete data set, node A would transmit eighteen messages to node B and node B would return two messages to node A for a total of twenty messages. A like number of messages would be interchanged between nodes A and C for a total of forty for the whole transaction between the nodes.

Returning now to the message format, the beginning of message character (1111) is detected by a node and starts an operation synchronized with the eight character message so that only the first character can be detected as having all ones. This allows the character 1111 to be used in subsequent character, or data, positions in the message.

The destination code is merely the number (1 to 6 in the illustrative embodiment) of the node to which the message is addressed. If the destination code 0000 follows the beginning of the message character, the message slot is delineated as a blank message. Any characters following a 0000 are in effect "garbage" characters, in that they have no message significance. It is expedient to leave them in and use the 0000 as a signal that they should be ignored. When a message is absorbed by a node, it inserts 0000 in the destination position. Even though it absorbs a message (enters it into its own registers), it leaves the characters C3 through C8 in the message.

The destination code signals a node whether the message is "mine" or "not mine," or, if 0000, that it can insert a message on line if it has one waiting. Thus, the message is so structured that it first alerts a node that a message is beginning, followed by the destination code which manifests an empty message slot, or whether the message should be absorbed or passed on by the node. If the destination code is compatible with the node, the next following command code instructs the node as to wishes of the initiating node.

There are five commands:

a. SP = send prepare. This is sent by the master node and instructs the addressed slave node to prepare for an update.

b. AP = acknowledge prepare. This is returned by a slave node to the master node in response to an "SP" command addressed to it.

c. SU = send update. This is sent by the master node to each data-sharing slave node after it has received AP acknowledgements from all prior addressed nodes.

d. AU = acknowledge update. This is sent by each slave node to the master node in response to an SU command addressed to it.

e. SX = send execute. This is sent to each slave node along with the data byte to be corrected. There is no acknowledgement for this command.

Following the command character in the message is the address of the sender. This is a four-bit number from one to six (in the illustrative embodiment) signifying the number of the node initiating the command or returning the acknowledgement. It is used in testing for relative priorities to resolve conflicts and to check off the returns of acknowledgements in the master node.

The next following character, the data set number, is the number which identifies the 16 bytes of data, constituting the data set, which is to be updated, either in whole or in part. The data set number and the next following data address identify the specific byte of data to be updated. If a whole data set is to be updated, the first data address transmitted is 16 (1111) followed separately by 15 (1110), etc. These data addresses are only sequentially decremented for successive SX commands. The prior commands and acknowledgements thereto use the set number to determine priorities.

The last two characters are actually the 8 bits of data (a byte) corresponding to the data address immediately preceding. If, for example, byte 5 of a given data set required updating, bytes 5, 4, 3, 2, and 1 would be transmitted even though no change in the bytes 4, 3, 2, and 1 would be effected. This is the result of the machine structure and the decrementing of the byte addresses.

Returning now to FIG. 1 and the broad system arrangement, cursory examination reveals that each node has an incoming and an outgoing communication line. Thus, every message on the line passes through the interface module of each node. The interface unit consists of seven 4-bit registers through which the successive characters are shifted in the manner of a shift register. A local timing pulse generator in the interface unit synchronizes the shift of the message and provides control signals to the update unit to identify the location of each character as it progresses through the successive shift registers. While the message is in the interface unit, the destination is analyzed by the update machine for "blank message," "my address," or "not my address." The update machine can then, (a) insert a message if the destination is 0000, or (b) absorb the message and insert 0000 in the destination if it is "my address," or (c) do nothing if it is "not my address." The absorption or insertion of messages is synchronized with the shift of characters through the interface unit.

The update machine will not now be described in detail. It consists essentially of registers for receiving the message from the interface unit, registers to store update information from its computer, registers to store a message intended for insertion on the line, a control word memory, logic for analyzing and selecting the sub-routines applicable to the detected situation, sub-routine timing means, and controls for processing the incoming and outgoing messages.

In the update machine, there are three basic routines and ten sub-routines. These will be described in detail in the detailed explanation of FIGS. 3A through 3Z.

The basic routines are:

a. OA = overall routine. This routine controls the update machine during its dormant or waiting period. It is operative to condition the machine to listen for a message or to listen for zeros.

b. RM = receive message. This is operative to control the update machine to absorb a message from the line.

c. TM = transmit message. This routine is operative to control the insertion of a message into the line when a blank message is detected.

The ten sub-routines employed by the update machine are:

a. SP = send prepare. This sub-routine controls the master update machine in the preparation of all of the SP commands to the slave nodes.

b. SP1 = send prepare after conflict. This subroutine is initiated at a node if it has received an SP command and has an update of its own with a higher priority.

c. P0 = prepare. This sub-routine is activated in a slave unit upon receipt of the first received SP command for a given data set to prepare an AP acknowledgement.

d. P1 = prepare upon conflict. This sub-routine is activated in a slave unit upon receipt of a second SP command for a given set of data to determine the relative priorities and return an AP acknowledgement only if the second command has a higher priority than the first.

e. AP1 = acknowledge prepare. This sub-routine is active at a master node to check off the AP acknowledgement received from the slave nodes.

f. SU = request to update. This sub-routine is active at a master node to prepare SU commands for transmission to all data-sharing slave nodes only if all nodes have responded with an AP acknowledgement.

g. U1 = receive update. This sub-routine is employed by a slave node in response to an SU command to prepare the AU acknowledgement for transmission.

h. AU2 = acknowledge update. This sub-routine is used by the master node in response to the receipt of an AU acknowledgement to check off the responses and to initiate an SX routine.

i. SX = send execute change. This sub-routine is used by the master node to prepare updates for each successive byte and each slave node.

j. X2 = receive execute. This sub-routine is used by each slave node to receive the SX command and associated data and enter it into the computer at the slave node.

The selection of eight of the sub-routines by the update module is effected by a so-called AND matrix. This matrix AND's the various combinations of node states with the commands. Each node has three states; 0, 1, and 2. A dormant node resides in the 0 state. The 1 and 2 states are set as follows:

1 state — Set in a master node as part of the send prepare sub-routine. Set in a slave unit in response to reception of the first received SP command.

2 State — Set in a master node as part of the request to update (SU) sub-routine. Set in a slave node in response to a received SU command as part of the U1 sub-routine.

The eight sub-routines which are called into action by the AND matrix as follows:
State 0 and SP Command at Master Node = SP sub-routine
State 1 and SP Command at Master Node = SP1 sub-routine
State 2 and SP Command at Master Node = No operation
State 0 and Received SP Command at Slave Node = P0 sub-routine
State 1 and Received SP Command at Slave Node = P1 sub-routine
State 2 and Received SP Command at Slave Node = No operation
State 0 and Received AP Acknowledgement at Master Node = No operation
State 1 and Received AP Acknowledgement at Master Node = AP1 sub-routine
State 2 and Received AP Acknowledgement at Master Node = No operation
State 0 and Received SU Command at Slave Node = No operation
State 1 and Received SU Command at Slave Node = U1 sub-routine
State 2 and Received SU Command at Slave Node = No operation
State 0 and Received AU acknowledgement at Master Node = No operation
State 1 and Received AU Acknowledgement at Master Node = No operation
State 2 and Received AU Acknowledgement at Master Node = AU2 sub-routine
State 0 and Received SX Command at Slave Node = No operation
State 1 and Received SX Command at Slave Node = No operation
State 2 and Received SX Command at Slave Node = X2 sub-routine The two remaining sub-routines SU (send update) and SX (send execute) are initiated upon completion of the checkoff of the acknowledgements returned to the master node.

A node in the 0 state is susceptible to any type of operation.

Message Progression Through the Interface

Every incoming message starts with a beginning of message character consisting of four ones, immediately followed by a destination code consisting of four zeros if it be a blank message, or one of the remaining fifteen combinations of four bits, including all ones if it is addressed to a node. Since in this illustrative embodiment there are only six nodes, the destination code will not exceed 0110.

The message is clocked through the interface by a clock pulse generator and the position of each of the eight characters which constitute the message is tracked through the interface by a counter which is stepped by the clock pulse generator.

The progression and tracking of the message characters through the transmission line interface is invariable even though in some instances the incoming message from the line is put back on the line without alteration and in other cases the incoming message is absorbed and a blank message substituted therefor. In both cases, the all ones "beginning of message" character proceeds without change. Also, in both cases all of the following characters retain their relative positions in the message, whether or not the coded representation thereof is unchanged or changed. Thus, some destination character (including all zeros) will invariably follow the beginning of message character. The remaining six characters will also follow, either unchanged or changed.

Figure 3A:
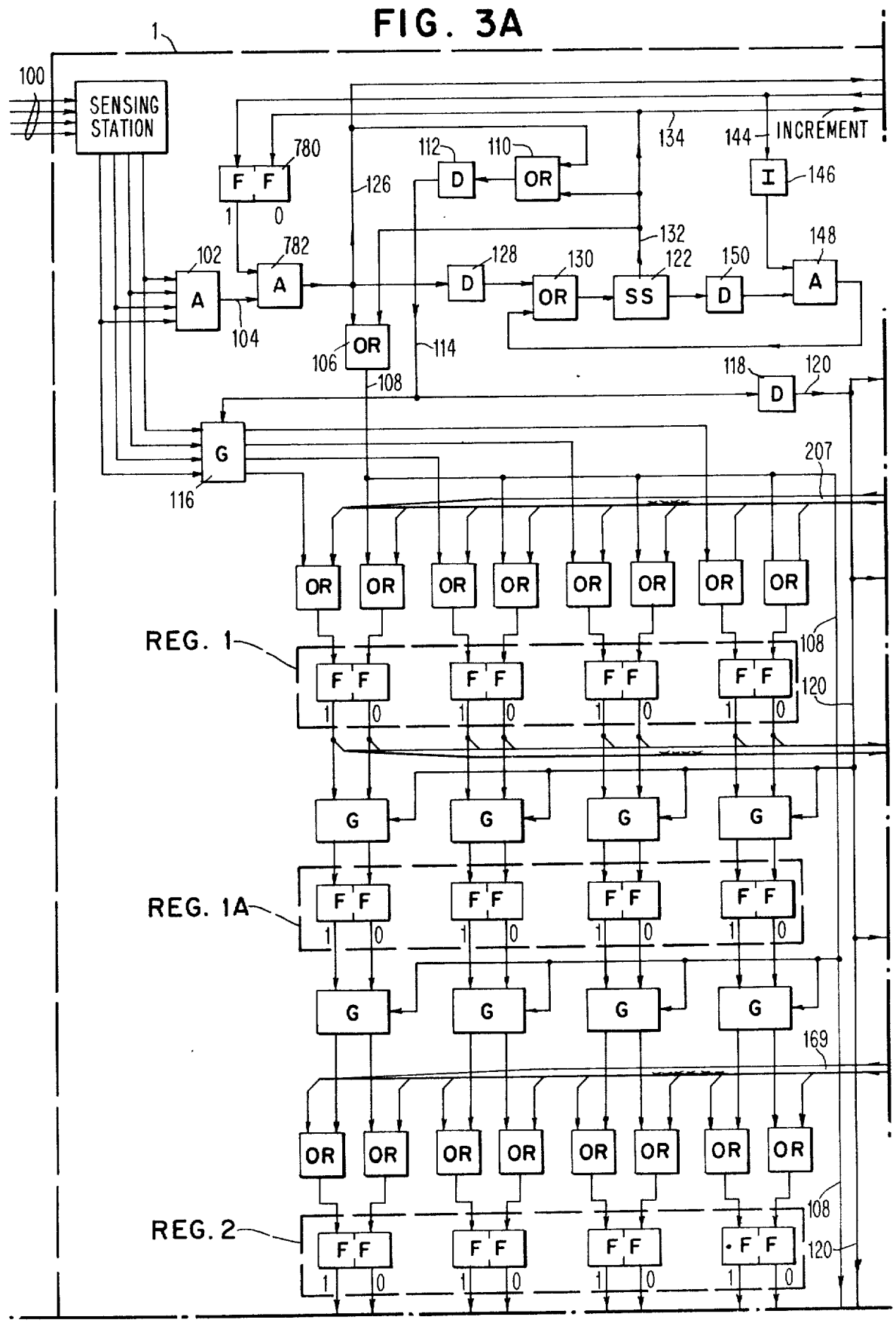
FIGS. 3A through 3Z show the detailed circuit diagram of the invention.

Turning now to FIG. 3A, any message appearing on lines 100 is applied to gates 102 and 116. If a beginning of message character C1 (all ones) is present, AND gate 102 is activated to produce a P0 timing pulse on line 104. In fact, any all ones character will produce an output on line 104. However, AND gate 782 is only activated once for each message cycle because flip-flop 780 is set to the one state at the end of the preceding message and reset immediately upon recognition of the next following beginning of message character.

With flip-flop 780 set, AND gate 782 will pass the P0 pulse generated by character C1 to OR gate 106 and line 108 which leads to three sets of four gates each connecting the outputs of registers 1A, 2A, and 3A, respectively, to the inputs of registers 2, 3 and 4 to effect the respective shift of the characters therebetween. The P0 pulse is generated only once during each message cycle. However, another pulse P1 having the same timing will be repeated for each subsequent character. For ease of reference, the P0 pulse can be considered as the pulse on line 126, and P1 as the pulse appearing on lines 132, 134, and 108. The P1 pulse will effect the inter-register shift of characters.

The P0 pulse, appearing on line 126 also resets the character counter 124 to all zeros. Thus, upon the initial recognition of the beginning of message character, the time reference P0, T0 starts, wherein P0 is the pulse time and T0 is the character count. At this time, none of the new message has been entered into the system.

The P0 pulse on line 126 enters OR gate 110 and delay 112, the delayed output of which constitutes pulse time P2. The sole function of P2 is to gate the characters from line 100 by means of the P2 pulse on line 114 which opens gate 116 to pass the line bits to the four OR gates connected to the one or set side of the four flip-flops constituting register 1. It is to be noted that there are only four incoming lines. Therefore, zeros and ones are manifested by no potential or some potential on the lines. Pulse P1 also resets register 1 to zeros through the OR gates connected to zero inputs of the flip-flops.

Other inputs, as for example from cables 207 or 169, consist of four pairs of signals. No resets are required for these entries, nor for any other entries into the other registers. All registers except register 4 have true and complementary outputs.

The P2 pulse appearing on line 114 operates delay 118 to produce a P3 pulse on line 120. This P3 pulse operates to shift characters from register 1 to register 1A, from register 2 to register 2A, from register 3 to register 3A, and from register 4 back to the lines. Pulse P3 on line 120 opens the four gates preceding registers 1A, 2A, and 3A and the gate preceding the line drivers to effect the character shift.

Pulse P3 also feeds logic circuitry in the update section to gate characters into and out of registers 1, 2, 3, and 4 (in only) at this time. This permits the extraction and insertion of characters from and into the shift register system at the appropriate time, working in conjunction with the character counter 124.

Before proceeding with the incrementing of the character counter 124, it is expedient to explain the generation of the P1, P2, and P3 pulses following the initial P0 pulse.

The P0 pulse, since it appears only once for each message cycle, must initiate a chain of timing pulses. The P0 pulse on line 126 activates delay 128 to produce a $P2_a$ pulse which through OR 130 fires single shot 122. This single shot provides the subsequent P1 pulses, being repetitively fired by the regenerative circuit through delay 150, AND 148, and OR 130. The AND gate 148 remains open for all counts of counter less than the maximum count, as manifested by a potential on line 144. Inverter 146 provides a constant potential on all counts except the final count.

Single shot 122 produces its repetitive P1 pulse, which, through OR 106, resets register 1 and gates the contents of the A registers into the respective next sequential registers as hereinabove described with respect to the P0 pulse. The P1 pulse on line 132 also through OR 110 activates delay 112 to provide the P2 pulse. The same P1 pulse on line 134 resets flip-flop 780 to deactivate AND 782 to nullify the effect of any characters after the first, also consisting of all ones. This permits use of the full spectrum of the four bits in all subsequent characters. Finally, the P1 pulse on line 134 increments the counter 124 upon each occurrence thereof, the counter having been reset as above described by the P0 pulse.

Counter 124 and its decoder 136 (binary to one-out-of-sixteen) keeps track of the progress of the message characters through the sequential shift registers. Initially, as described, this counter is reset by the P0 pulse upon detection of the all ones beginning of message character C1 in AND 102. If this reset is referred to as T0 time, the C1 character is entered into register 1 at T0, P2 time. Subsequent entries of message characters occur in accordance with the chart shown in FIG. 2, wherein C1 through C8 are the eight message characters, T0 through T12 are the times delineated by counter 124, and P1 through P3 are the timing pulses produced by the single shot 122 and associated delay circuitry.

Figure 2:
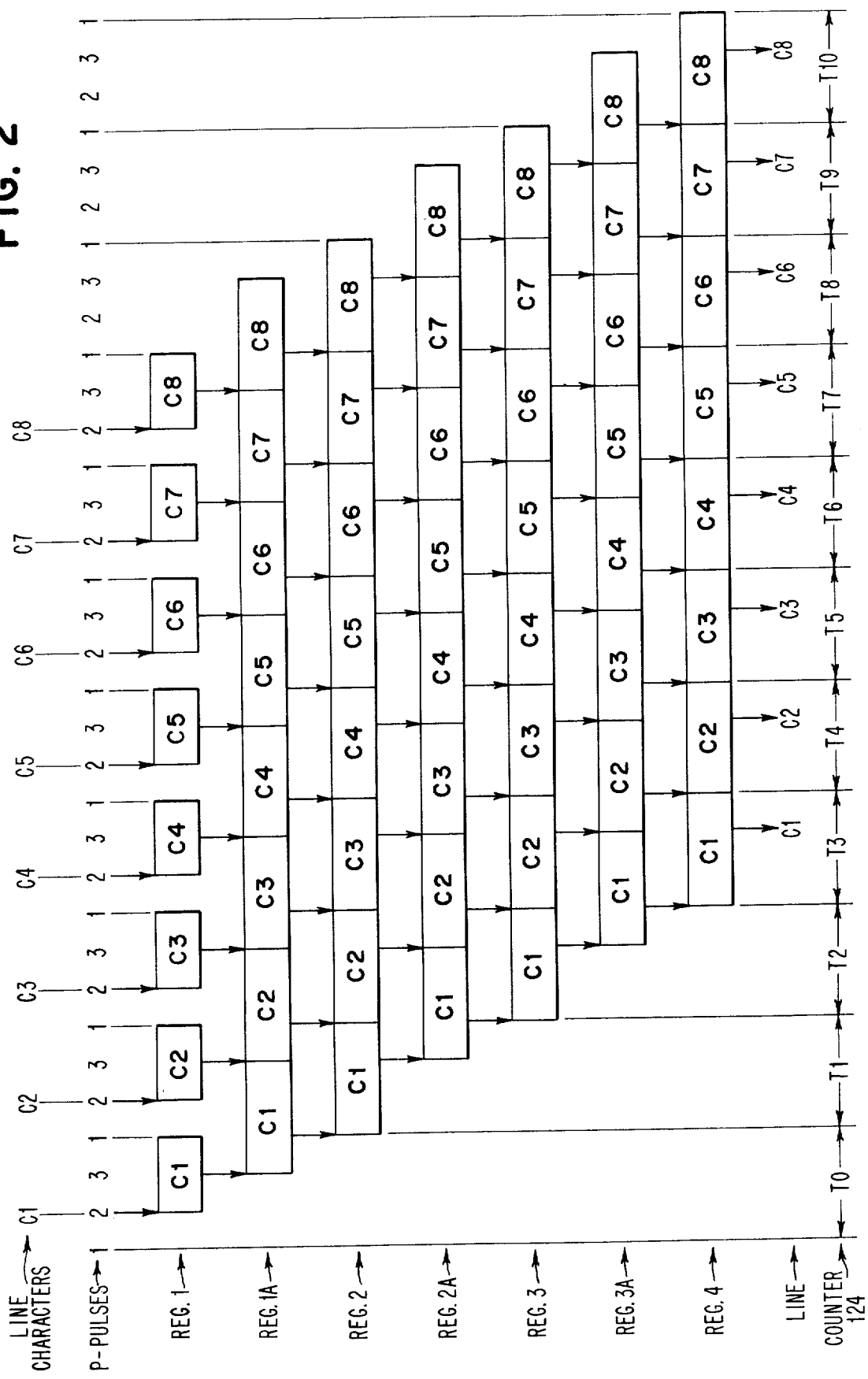
FIG. 2 is a timing chart showing the progression of a message through the update module.

Examination of FIG. 2 will reveal that C1 progresses through the shift registers and is read out to the line at T3-P3 time. Each succeeding character follows sequentially until C8 is entered into the line at T10-P3 time. Thus, the count in counter 124 must include at least ten counts to shift a complete message through the transmission line interface shift registers. However, to provide an intermessage blank space on the line, the count on line 144 is arbitrarily chosen as thirteen.

When the count in counter 124 achieves thirteen, decoder 136 energizes line 144, which, through inverter 146, deactivates AND 148 to stop the regeneration of the "P" pulses. Potentialization of line 144 also sets flip-flop 780 to energize AND 782 making it susceptible to passing the potential produced by the next following all ones beginning of message character. Since the line is initially filled with messages, the interface unit will always be active to receive and reinsert messages from and to the line, whether or not they be blank messages or valid messages.

It is to be noted that the counter 124 keeps track of each character as it progresses through the shift registers. Thus, if a character is to be extracted or inserted, it must be gated out of or into the appropriate register at the proper time. The chart in FIG. 2 will be of assistance in understanding this gating.

Except for the detection of the destination character (C2) and the insertion of a blank message character by inserting all zeros in the destination slot, all characters are entered or extracted at either T4 or T7 times.

At T4 the following registers contain the following characters:

| Register 1 | - | C5 (Set Number) |
|---|---|---|
| Register 2 | - | C4 (Sender) |
| Register 3 | - | C3 (Command) |
| Register 4 | - | C2 (Destination) |
| At T7 the characters are disposed as follows: | | |
| Register 1 | - | C8 (Byte Data) |
| Register 2 | - | C7 (Byte Data) |
| Register 3 | - | C6 (Data Address) |
| Register 4 | - | C5 (Not Gated - See T4 supra) |

The destination address is detected in register 1 at T1 time. A blank message character (C2) is inserted into register 2 at T2 time. A new valid destination number is inserted in register 4 at T4 time.

Operation Upon Characters in Interface

The first operation upon any incoming message is to test the destination character to determine if the message is (a) blank (binary zero), (b) destined for another node, or (c) destined for this node. If the message slot is blank (all zeros in C2), then two operations are possible, (a) pass it on, or (b) insert a locally generated message in its place. If the message is addressed to another node, it must be passed on without change. If the message is addressed to this node, it will be absorbed if the node is not otherwise occupied. If so, the message will be left in the line for another time.

Figure 3B:
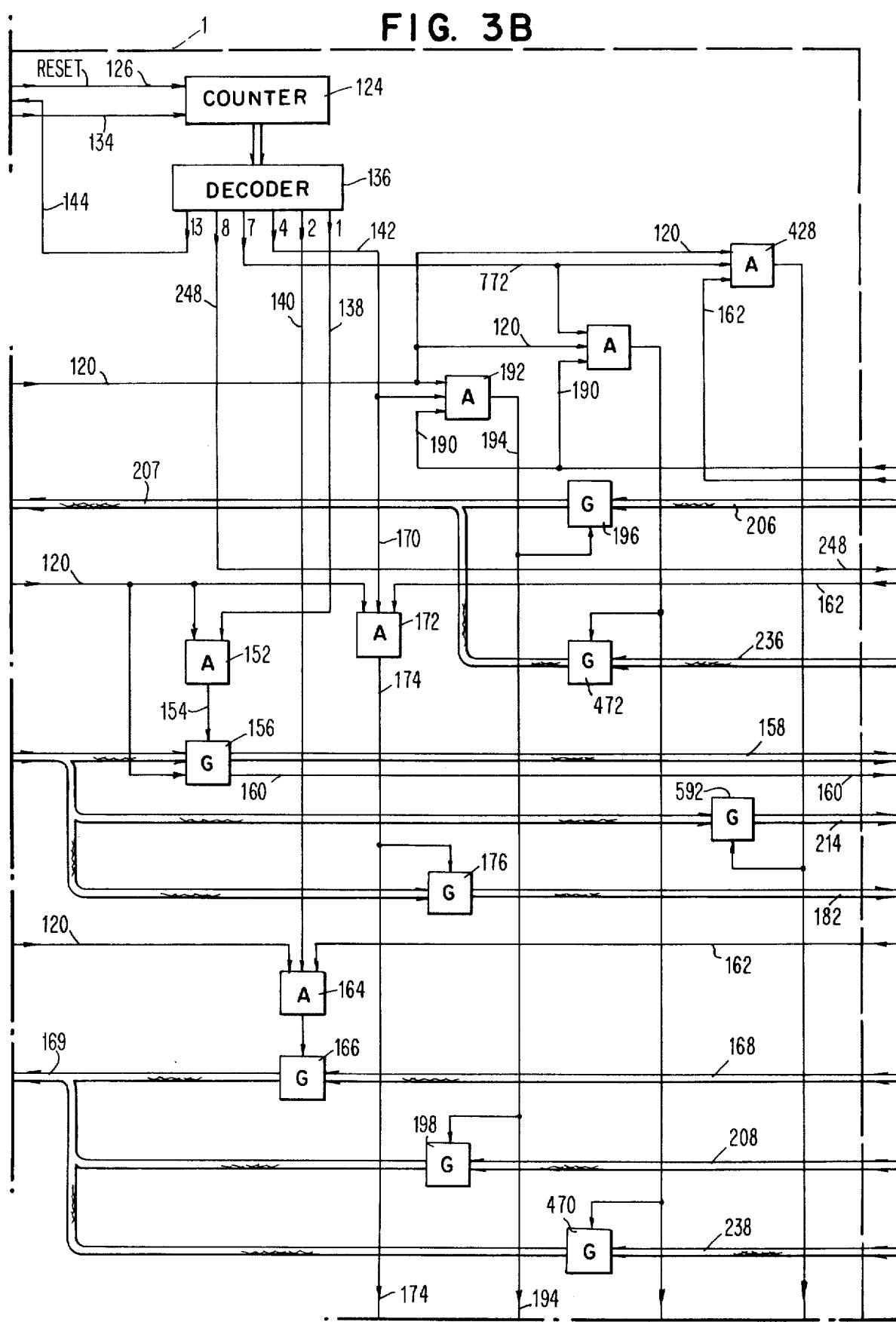
FIG. 3 shows the relative positions of FIGS. 3A through 3Z when joined.
Figure 3C:
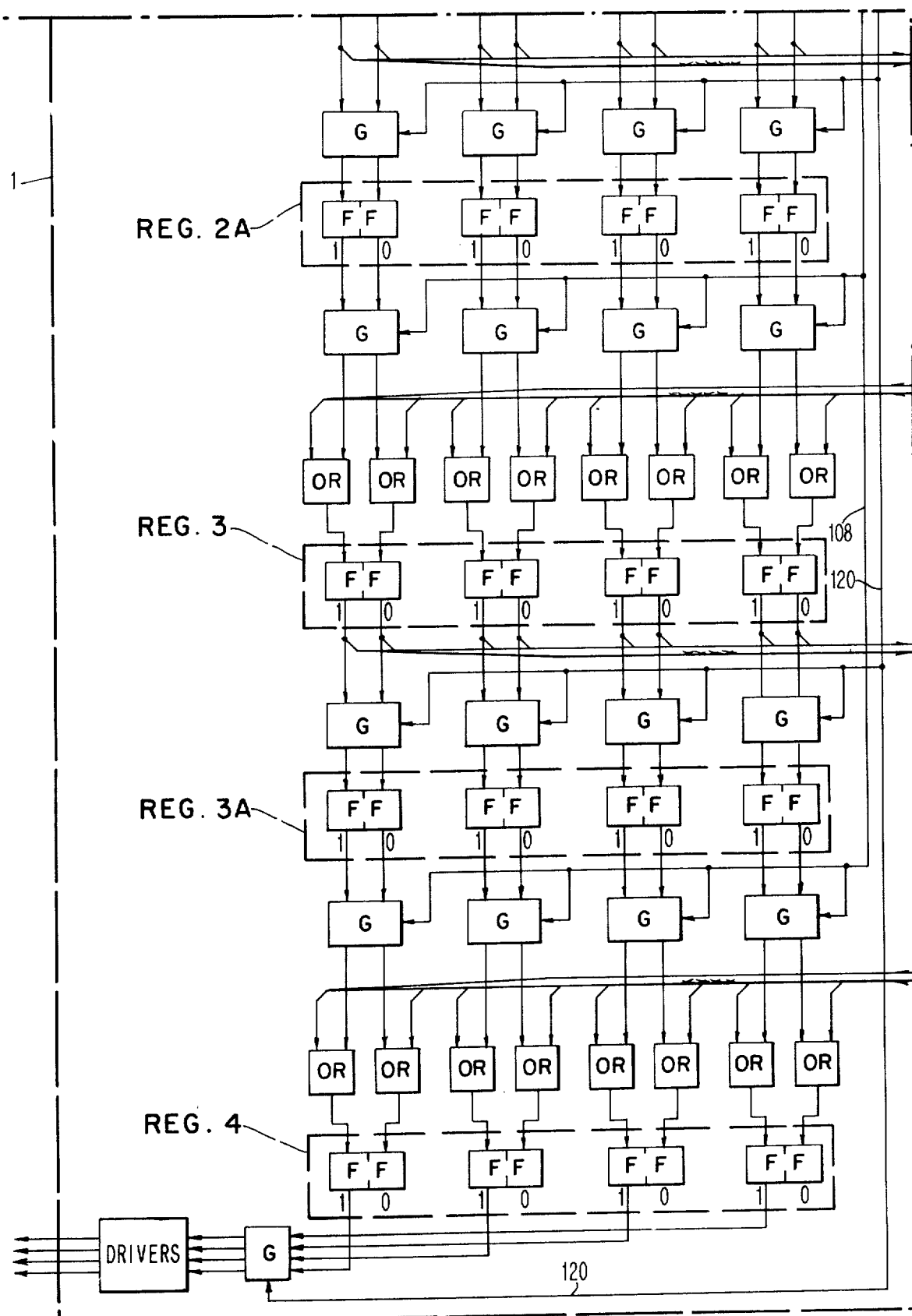
Figure 3D:
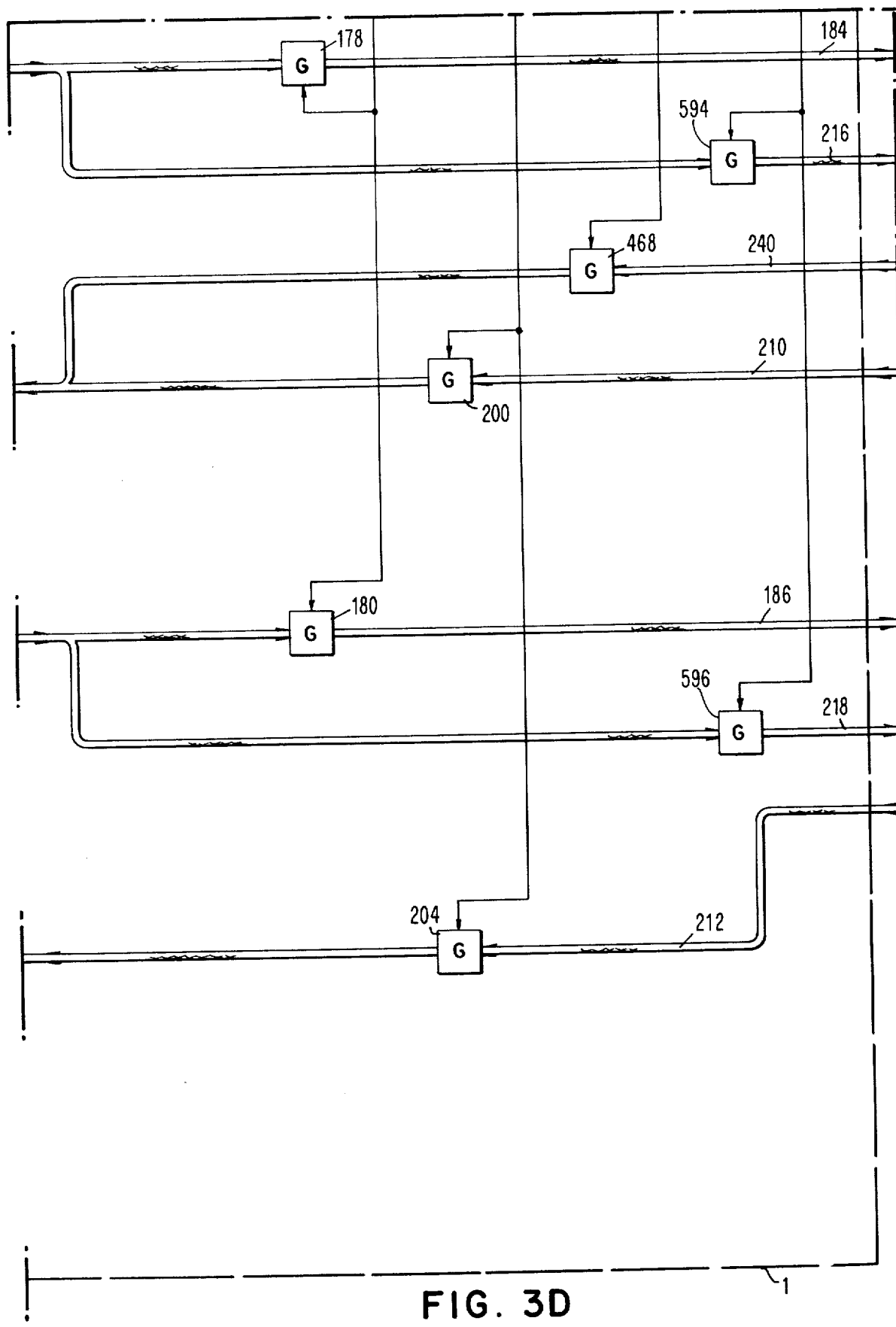

The first order of business, therefore, is to test C2 at the earliest opportunity following detection of a C1 character. As explained, C2 is in register 1 at T1 time. Therefore, when line 138 (FIG. 3B) manifests a T1 time, AND 152 receives a P3 pulse from line 120 to open gate 156 to introduce the C2 character into cable 158 which joins cable 220 and exits as cable 158 on FIG. 3E. There it enters register 396 and decoder 398 to produce one of three outputs, all zeros, "not my address," or "my address." If register 396 is a four-bit register, then decoder 398 would include a four input AND gate with zero inputs from the register. The "my address" line would be the output of a second 4-input AND gate having zero and one inputs corresponding to the node number. Node five, for example, would have hard-wired inputs of 0101 to the AND gate. The "not my address" would be the inverse thereof.

Thus, at T1 and P3 time of the interface, the nature of the message will be partially determined. However, the update machine has its own timing controls which must be coordinated with the message progression timing. Therefore, the update machine has a series of sets of timing pulse generators which are selectively activated upon the determination of need. These are analogous to the micro-programs in general purpose computers.

In the first example, it will be assumed that the local update machine has no reason to generate and transmit any message. Therefore, it has no reason to look for a blank message slot. Its sole function is to look for a destination address intended for it. Derivatively, if it finds a message "not for me," it must avoid interfering with it and allow it to proceed through the interface.

When gate 156 is opened at T1 and P3 time to gate C2 to the destination address register 396 for test, it also gates the P3 pulse on wire 120 to wire 160 and, via cable 400, to FIG. 3S where, if the "listen for message" latch 370 is set (as in fact is is), AND 394 will be active to pass the P3 pulse on wire 160 to fire single shot 402 to produce an RM-1 pulse in cable 358.

Figure 3E:
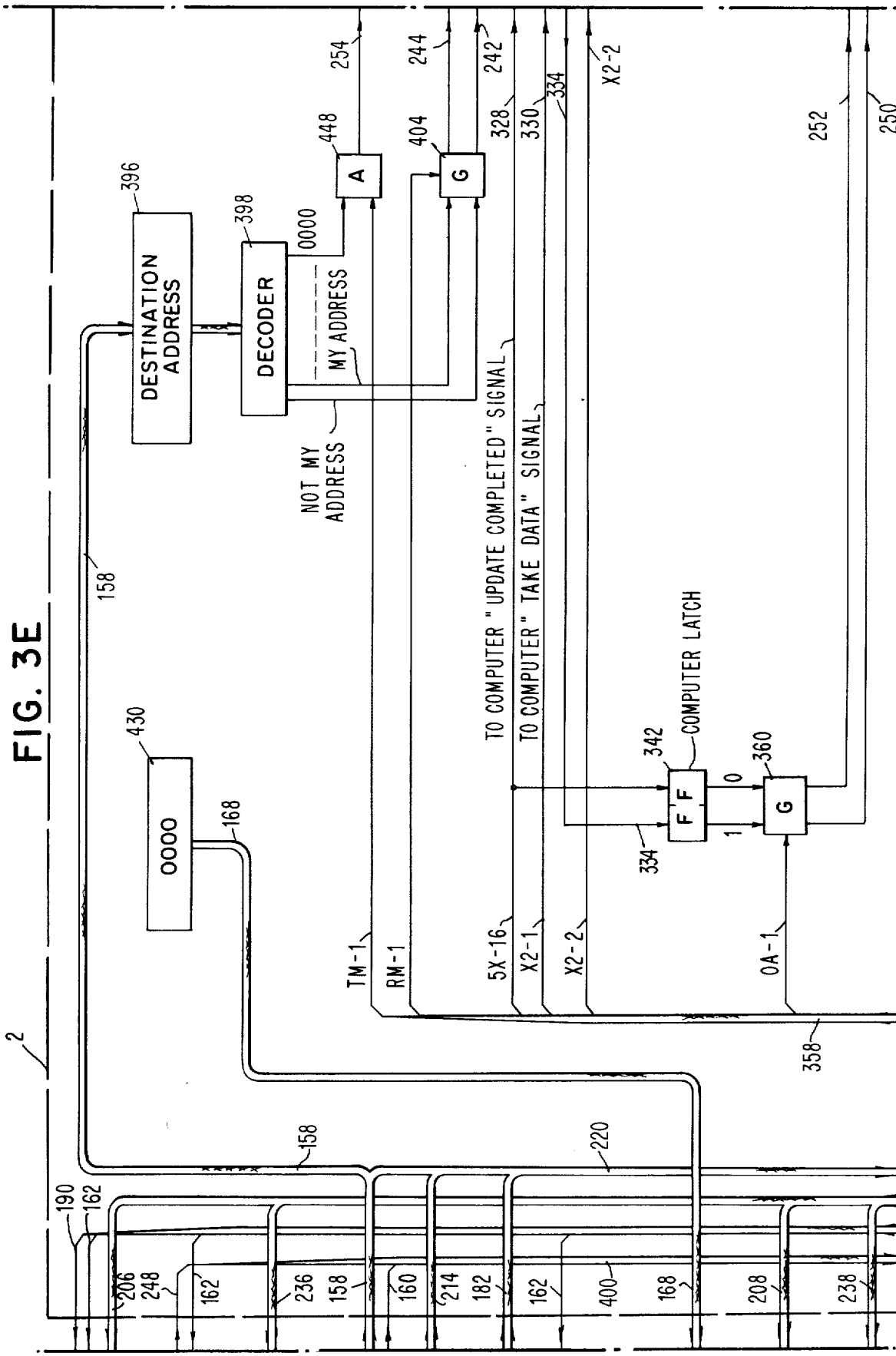

The RM-1 pulse reappears on FIG. 3E to open gate 404 to gate the "not my address" or "my address" signals to lines 242 and 244, respectively. The "not my address" signal on line 242 via cable 362 to FIG. 3S and OR 406 to reset the "listen for message" latch 370. It also is connected to OR 408 (FIG. 3U) to fire single shot 354 to produce the OA-1 pulse.

The OA-1 pulse feeds through cable 358 to FIG. 3E and gate 360 to test computer latch 342. Since, in the example chosen, the computer requires no service, latch 342 will be reset, thus gating a potential to line 252 and thence to FIG. 3V and OR 368, the output of which fires single shot 366 to produce an OA-5 pulse, which pulse sets the "listen for message" latch 370 on FIG. 3U. The destination register 396 will retain the destination until a new entry is made. However, the valid message signal on line 160 appears only at T1-P3. The TM-1 pulse will not be produced a second time. Even if it were, it would only produce several operations of the circuitry just traced.

The update machine, in the absence of a computer request, will dwell awaiting the next occurring entry of a new destination address into register 396 to start another test sub-cycle. This allows the "not my address" message to shift through the interface under control of the P1, P2, and P3 shift pulses produced therein. No extraction or introduction of characters will be effected. The C2 character read out of register 1 at T1-P3 time will be shifted into register 1A at the same time and proceed absorb"be shifted in synchronism with the other characters in accordance with the timing shown in FIG. 2.

Returning now to the second possibility of a message intended for this node, with no local request for service, the destination address in register 396 (FIG. 3E), through decoder 398, will yield a "my address" signal. The T1-P3 pulse on line 160 will be passed by AND 394 (FIG. 3S) to fire single shot 402 to produce the RM-1 pulse as heretofore explained, the "listen for message" latch having been set at OA-5. The RM-1 pulse will now produce a "my address" signal on line 244. This will initiate a "message absorb" operation.

The "my address" signal on line 344 exits from the cable 362 on FIG. 3T to fire single shot 410 (FIG. 3S) to produce the RM-2 pulse, which, via cable 358, sets the "message absorb" latch 412 adjacent to the single shot. The one state of latch 412 potentializes line 162 in cable 358, which line exits from the extension cable 426 on FIG. 3E in three places. The first exit potentializes AND 172 (FIG. 3B) which has further inputs of character count T4 and timing pulse P3. At this time, as shown in FIG. 2, the disposition of the characters in the registers is as follows:

C5 (data set number) is in register 1
C4 (sender number) is in register 2
C3 (command) is in register 3

These are now entered into the update machine. The output of AND 172 at T4, P3 and the duration of latch 412 opens gates 176 (for register 1), 178 (for register 2) and 180 (for register 3) to gate the outputs of these registers as follows:

Register 1 to cable 182
Register 2 to cable 184
Register 3 to cable 186

Cables 182, 184, and 186 merge into cable 220 and exit separately on FIGS. 3E and 3I with the same numbers.

The command in register 3 is entered in the received command register 418 (via cable 186). The sender number is entered in the address of sender register 416 via cable 184, and the data set number is entered via cable 182 in register 414.

The update machine remains in this state until T7, P3 time of the interface, at which time the characters have been shifted through the registers with the following result:

C8 (2/2 data byte) is in register 1
C7 (1/2 data byte) is in register 2
C6 (data address) is in register 3

Figure 3F:
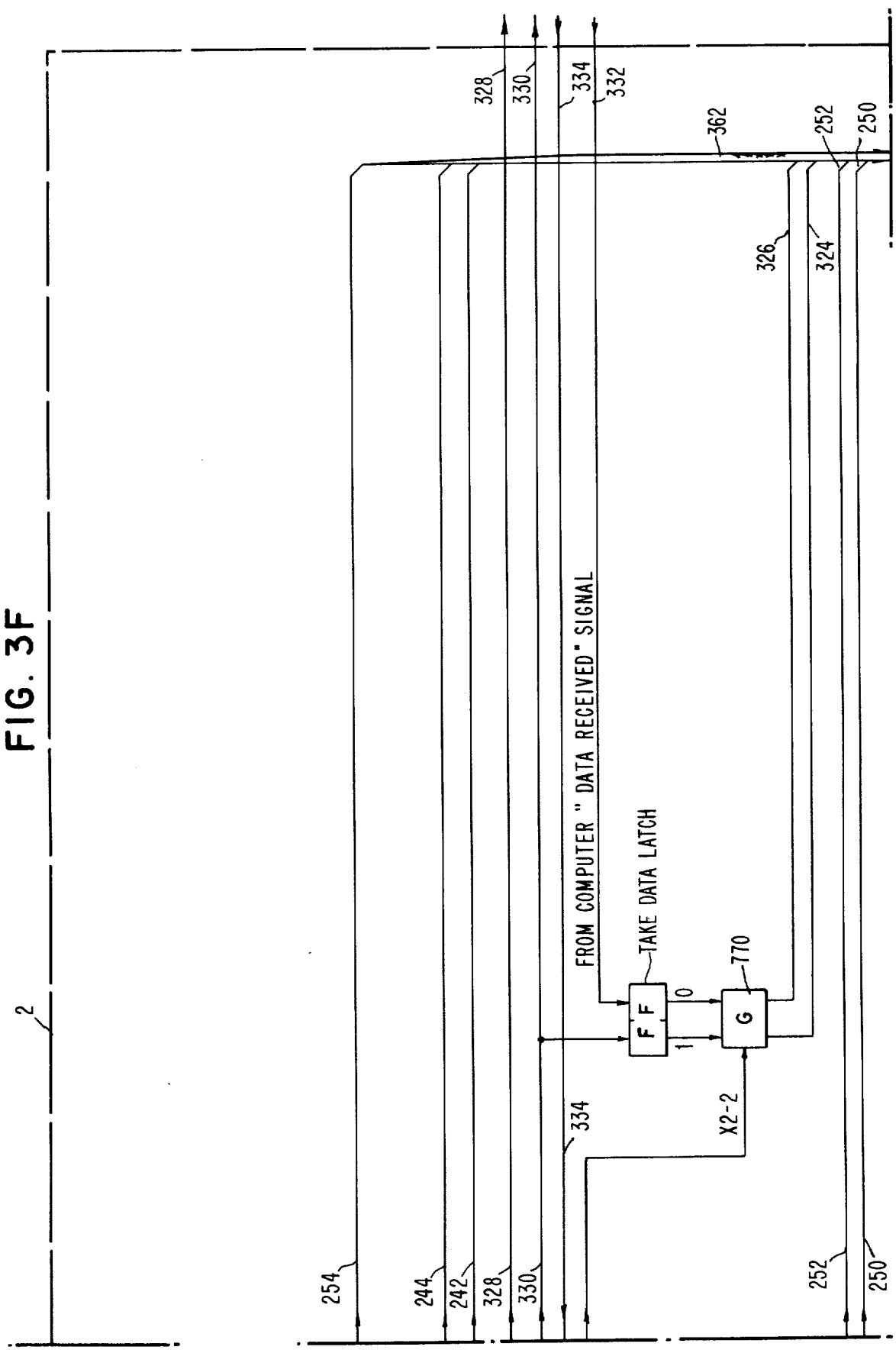
Figure 3G:
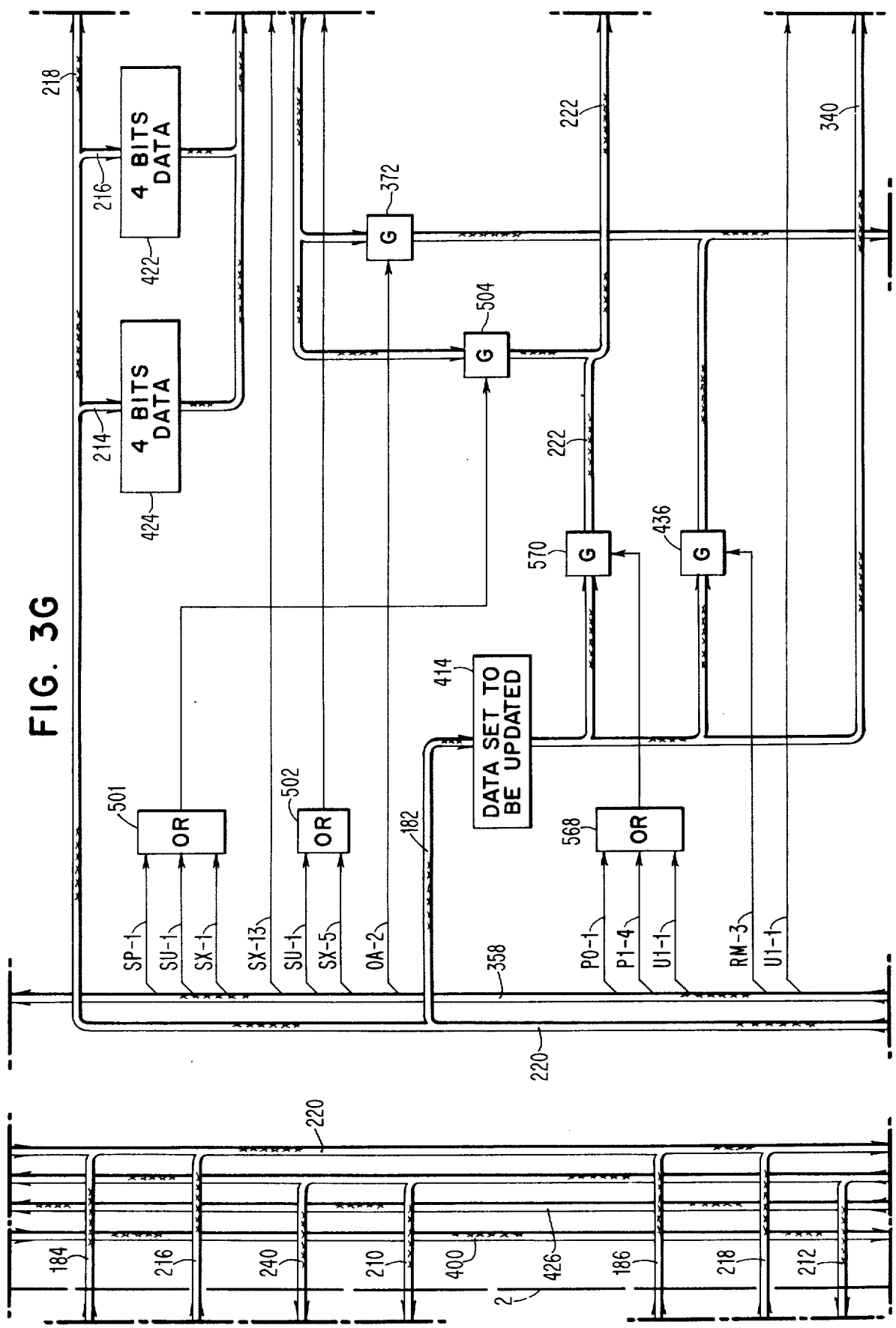

The continuing potential on line 162 (from "message absorb" latch 412) together with the T7 and P3 timing pulses from the interface activate AND 428 (FIG. 3B), the output of which opens gates 592, 594, and 596 to gate the contents of registers 1, 2, and 3, respectively to cables 214, 216, and 218, which merge into cable 220 and exit separately on FIGS. 3G and 3H. Cable 214 enters the second half of the data byte into register 424, 216 the first half data byte into register 422, and 218 the data address into register 420. The transfer of the characters from the interface to the update machine is now complete.

Since a message has been absorbed from the line, a blank message must be reinserted into the line. It was known at T1, P3, RM-1 time that the message was "my message." At RM-2 time the "message absorb" latch 412 was set to potentialize line 162. In addition to its function of gating out the registers at T4 and T7 times, line 162 cooperates with T2 and P3 in AND 164 (FIG. 3B) to open gate 166 to gate the contents of cable 168 into register 2 at this time. Cable 168 connects in FIG. 3E to the all zero emitter 430 so that 0000 is entered in register 2 at T2, P3 time. Reference to FIG. 2 will confirm that C2 (destination address) is in register 2 at this time.

The 0000 marker denotes an empty message slot. That the remaining characters are permitted to shift through and re-enter the line will have no effect upon subsequent operations. These "garbage" characters will be ignored as soon as the empty message character is detected.

Since the update machine now has a complete message stored in six registers, it is ready to undertake some decisions. It is to be noted that neither the beginning of message or destination characters are stored. Since their recognition in the update machine initiated the operation in the first instance, there is no further need for these characters.

If it is assumed that the message just entered into the update machine is the first message upon startup of the system, the attendant command will be an SP command, or send prepare. That particular message will now be traced in the update machine.

The extraction of characters from the interface was effected at T4 and T7 times of that module. Therefore, when that module's counter 124 reaches a count of eight, readout has been complete. Therefore, the eight count on line 248 (FIG. 3B) enters cable 400 and exits on the same line in FIG. 3S to cooperate in AND 432 with the one state of "message absorb" latch 412 (set at RM-2) to fire single shot 434 to produce RM-3 to reset latches 406 and 412. The RM-3 pulse also opens gate 436 (FIG. 3G) to gate the data set number in register 414 to the memory address register 374. Pulse RM-3 also fires single shot 438 to produce the RM-4 pulse, which latter pulse activates OR 378 (FIG. 3K) to cause memory 350 to read out all information with respect to the data set entered in the memory address register 374. The control word, consisting of eleven fields of data is entered into the register 352.

The memory word contains only control information. Its sole function is to resolve priorities with respect to conflicting orders relative to the same data set. Priorities are established by set number only. The control word consists of the following fields which are segregated in the register 352;

| | | |
|---|---|---|
| Field 1 (352-1) | - | 4 bits stores present sender of the message. |
| Field 2 (352-2) | - | 6 bit data sharing vector. A "1" is inserted in each bit position to denote that the corresponding node also stores the same data set. |
| Field 3 (352-3) (352-8) | - | 6 three bit sub-fields storing the priority each node has for updating this data set. |
| Field 4 (352-9) | - | 2 bits denoting the "state" of the update machine. This is not received from memory. |
| Field 5 (352-10) | - | 6 bits of check off. This field initially contains the data sharing vector information. As each node responds, the ones are reset to zero as a check off of the returns. |
| Field 6 (352-11) | - | 4 bits storing the initial address of the highest byte number to be updated. For each update, the count is decremented until it reaches zero. |

Returning now to the entry of data into the memory data register 352, it is seen that only certain data came from the memory 350 at time RM-4. The RM-4 pulse fires single shot 440 (FIG. 3S) to produce the RM-5 pulse.

The RM-5 pulse, exiting from cable 358 at FIG. 3I opens gate 790 to gate the command entered into register 418 into cable 792 and thence to decoder 794 (FIG. 3P), which has outputs P, AP, U, AU, and X corresponding to the five commands hereinabove explained with respect to the message format. Each node has a state counter denoting the status of it activity. Normally, in the absence of any demands for its service, the state counter resides in the zero state, where it is now assumed to be.

Thus, with the onset of the RM-5 pulse, gate 384 gates the three state bits (now all zeros) to state register 386 and the decoding AND gates connected thereto to produce a O output to the top horizontal line of the AND matrix on FIG. 3O. At the same time (RM-5) gate 790 (FIG. 3I) gates the received command in register 418 to cable 792 and thence to decoder 794 (FIG. 3P) to provide one vertical input to the AND matrix. Since a P command and a O state exist, the AND gate having the PO output is activated. This output is gated after a delay from delay 390, activated from OR 388 and RM-5, via gate 392 to cable 246 and cable 362 to FIG. 3W to fire single shot 564 to yield a PO-1 pulse.

The PO-1 pulse, via cable 358 and OR 508 (FIG. 3K), sets the state register portion 252-9 of the memory data register 352 to the 1 state. The same pulse also, via OR 566 (FIG. 3Q), gates a precoded AP command to the command register 456 and gates the data set number in register 414, via OR 568 and gate 570 (FIG. 3G), to cable 222 to data set number register 460 (FIG. 3T). It also gates the sender's address to cable 224 by means of OR 576 and gate 578 (FIG. 3I) and thence to the destination register 454 (FIG. 3S). Finally, the PO-1 pulse, by means of OR 572 and gate 574 (FIG. 3I) gates the sender's address to the first field (252-1) of the memory data register 352 (FIG. 3K).

Upon cessation of the PO-1 pulse, single shot 580 (FIG. 3W) is fired to produce the PO-2 pulse. This PO-2 pulse, through OR 552 (FIG. 3U) sets the "listen for zeros" latch 442 because the node needs a blank message slot in which it can insert its confirming answer. The PO-2, via OR 562, reads the memory data register 352 back into memory 350. The memory address for storing has been retained in the memory address register 374 where it was entered at OA-2 time as hereinabove explained. This now contains the following:

Address of the original sender
Data sharing vector
Six nodal priorities
Node state 1
Check off data The PO-2 pulse, upon cessation, fires single shot 584 via OR 582 (FIG. 3W) to produce the PO-3 pulse. This PO3 pulse tests the "listen for zeros" latch 442 for 0 or 1 by means of gate 586. If 1, as it is, line 268 will be potentialized to fire single shot 588 to produce the PO-4 which refires the PO-3 to continue the listening operation. Although not applicable here, the 0 state for "listen for zeros" latch 442 will produce a pulse on line 270 which through the "no operation" OR gate 368 (FIG. 3V) fires single shot 366 to produce timing pulse OA-5.

When a blank message slot comes into the interface and all zeros are in register 1 at T1-P3 time of the interface, the destination is gated into the destination register 396 (FIG. 3E) as hereinabove explained. The P3 pulse on line 160 in conjunction with the "listen for zeros" latch 442 (now in the 1 state) operates AND 444 (FIG. 3U) to fire single shot 446 to produce a TM-1 pulse. This pulse operates AND 448 (FIG. 3E) to produce an all zeros signal on line 254 which returns to fire single shot 450 to produce the TM-2 pulse which sets the "message transmit" latch 452. This latch prepares AND 474 to receive the T8 pulse from the interface. Most immediately it potentializes line 190 to gate characters into the shift registers at the requisite times.

Line 190 exits from cable 358 on FIG. 3E where it cooperates with T4, and P3 in AND 192 (FIG. 3B), the output of which on line 194 opens gates 196, 198, 200, and 204 to gate the contents of cables 206, 208, 210, and 212, respectively, into registers 1, 2, 3, and 4.

The entry and source of characters at T4 is as follows:

Register 4 — cable 212 — destination number from register 454
Register 3 — cable 210 — command from register 456
Register 2 — cable 208 — sender number from register 458
Register 1 — cable 206 — set number from register 460

All of the delivering registers (454 – 460), located in FIG. 3S, store the characters previously entered as a waiting command, actually, an AP acknowledgement.

Although it is not needed for this particular acknowledgement, the remaining characters in registers 462 (data address), 464 (4 bits of data), and 466 (4 bits of data) appearing respectively on cables 240, 238, and 236 are gated into registers 3, 2, and 1 at T7 time. These "garbage" characters are inserted merely to simplify the gating procedure when an actual data amendment is to be effected. They are ignored in all orders except an SX command.

Figure 3M:
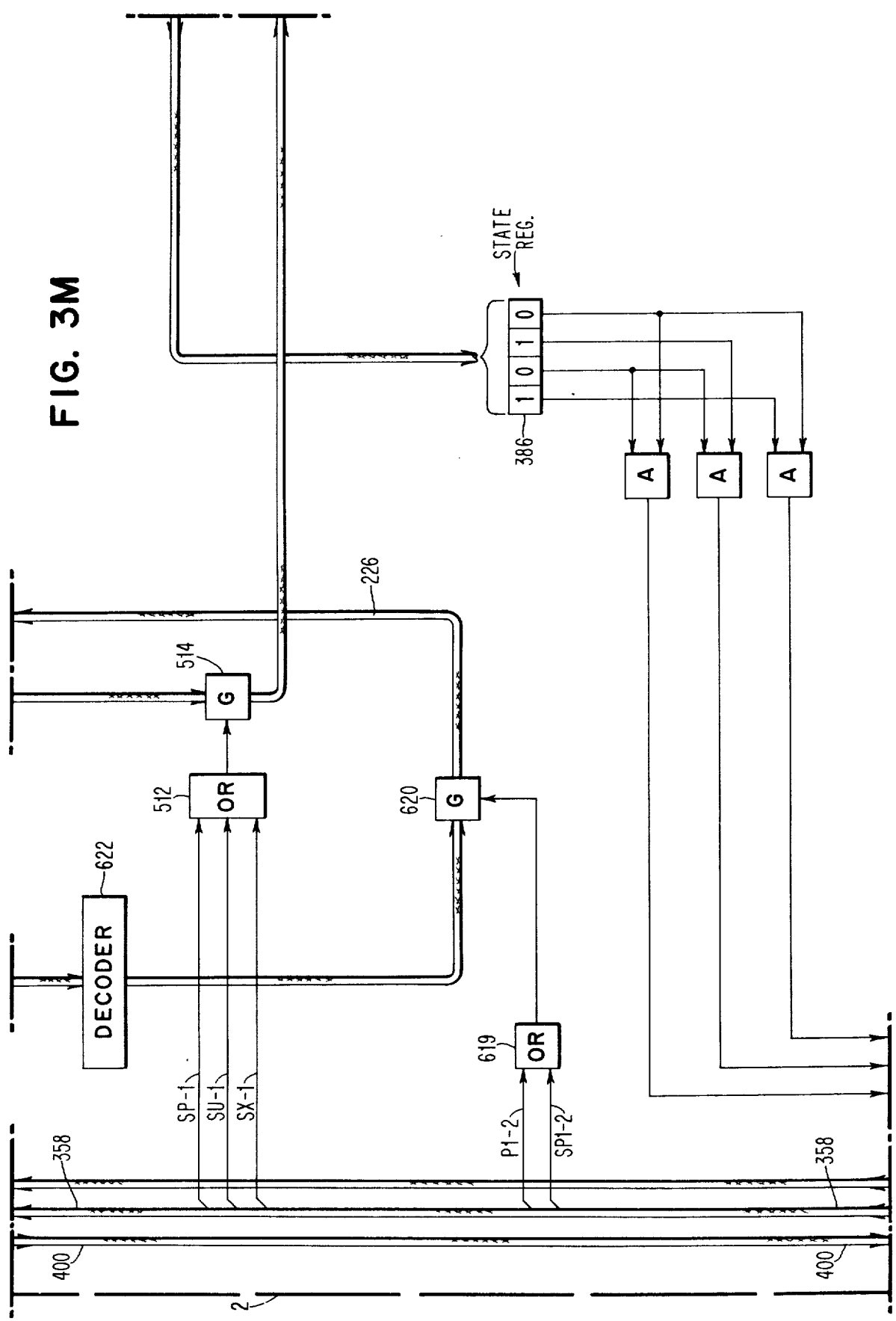
Figure 3N:
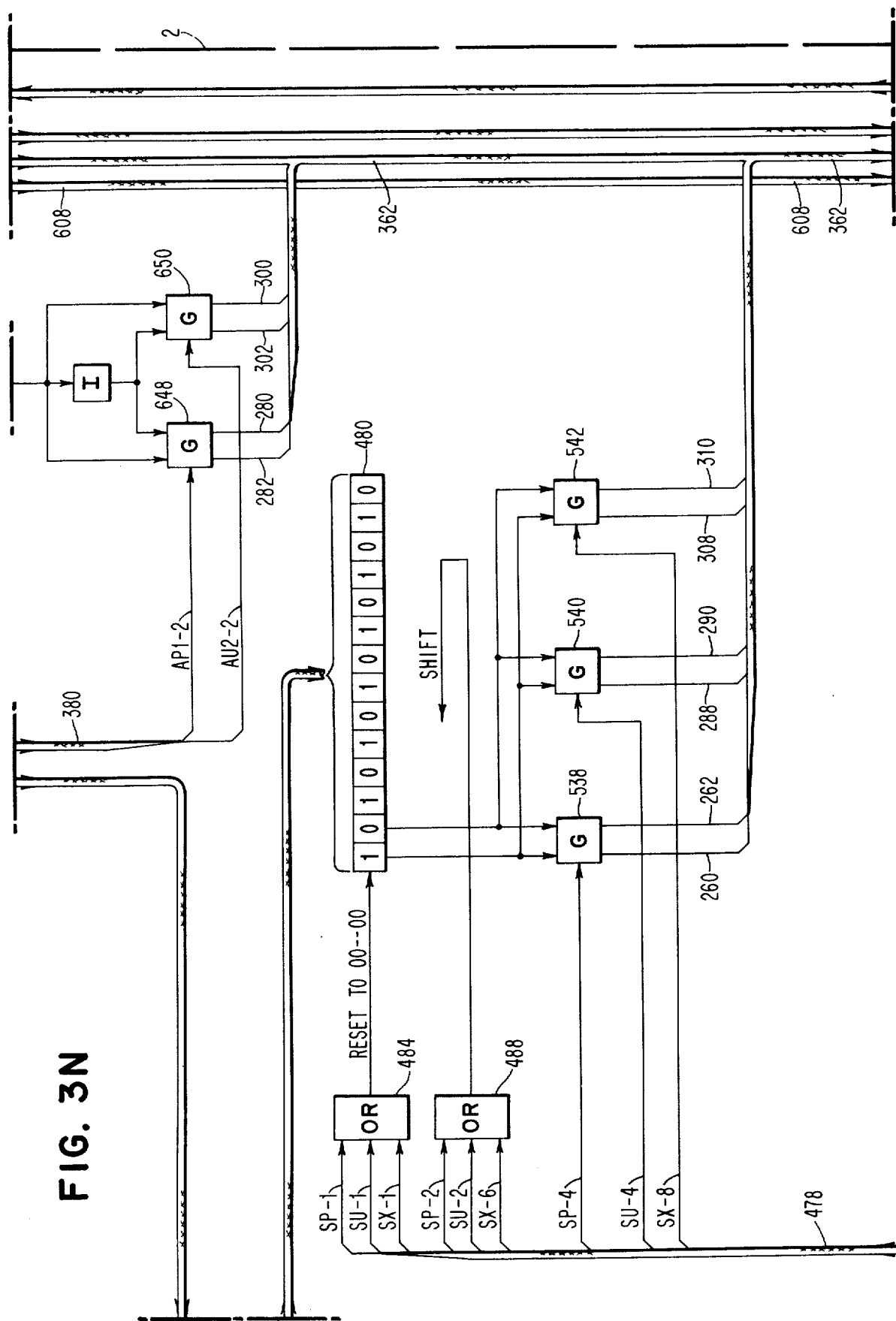
Figure 3Q:
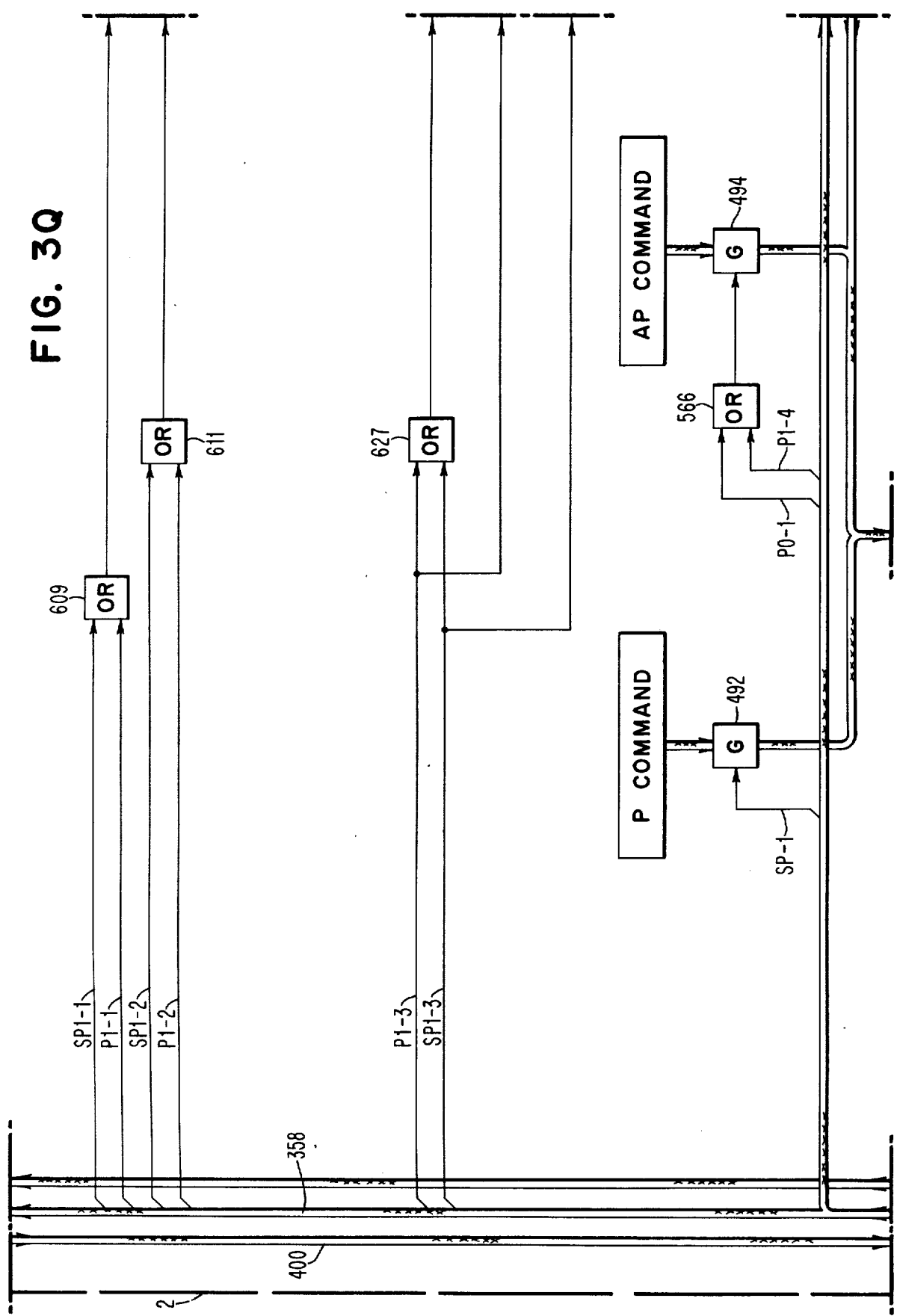
Figure 3R:
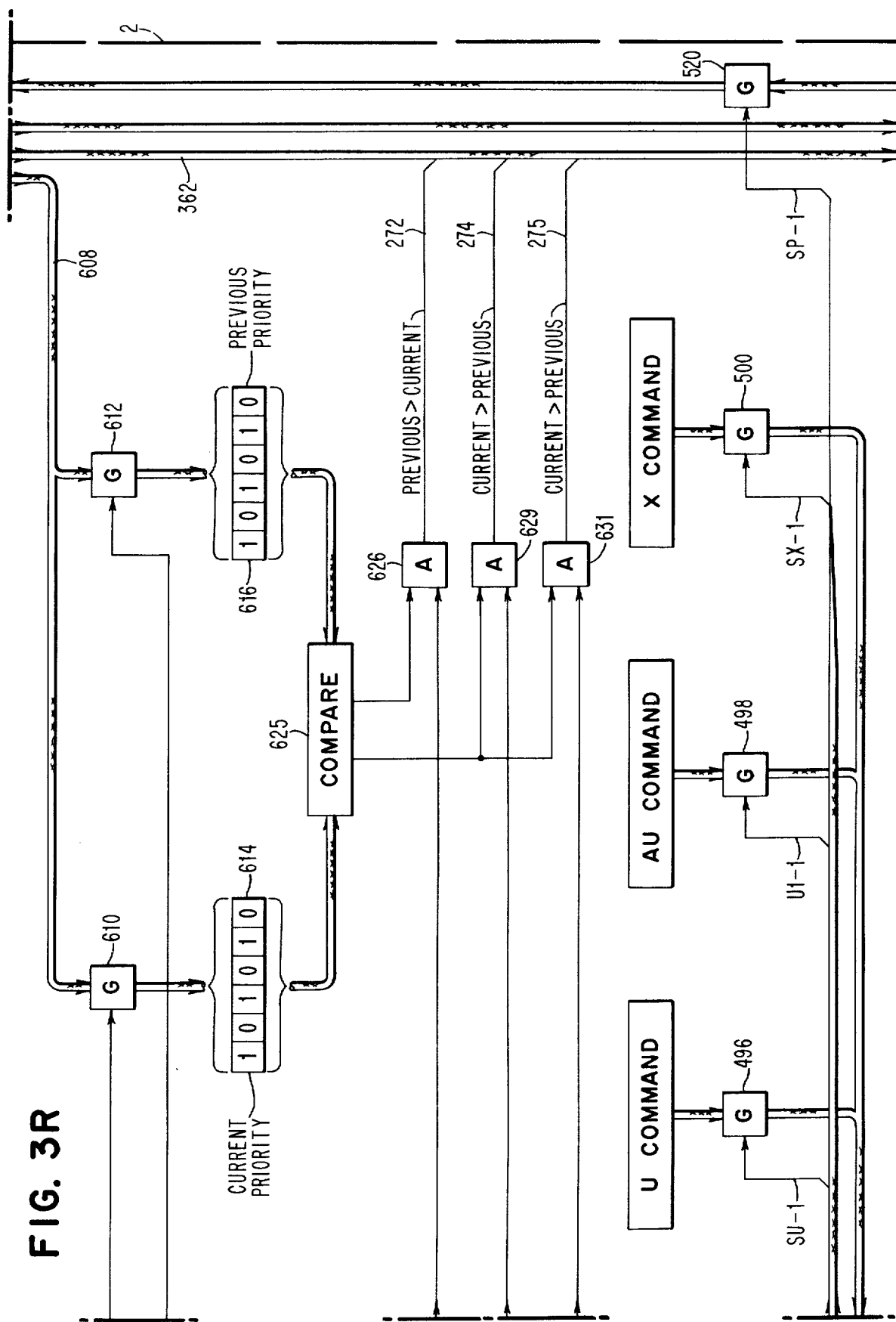
Figure 3U:
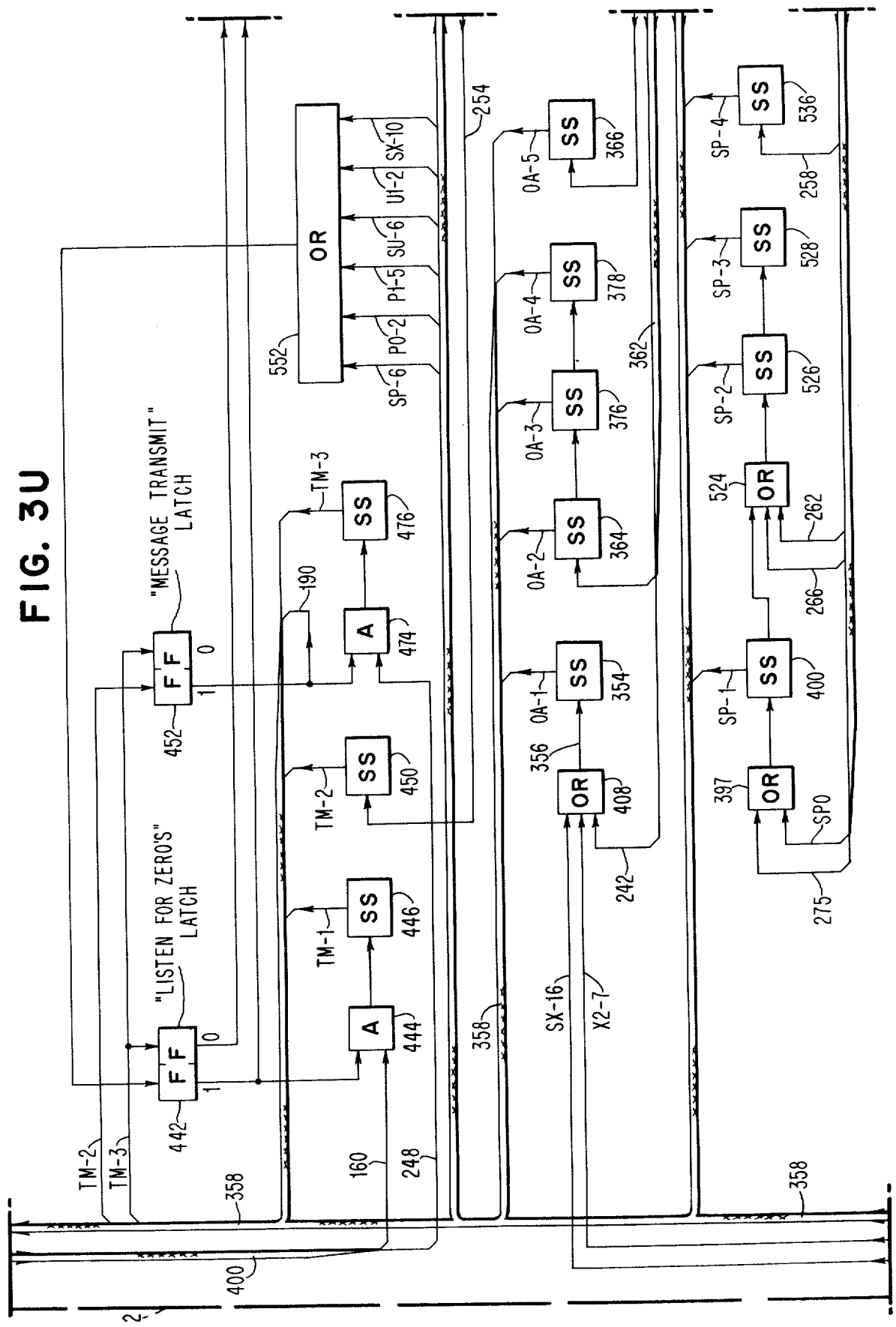

At T8 time of the update machine, the data insertion has been completed, and this pulse produces a signal on line 248, which, on FIG. 3U, operates AND 474 together with the one state of "message transmit" latch 452 to fire single shot 476 to produce a TM-3 pulse. TM-3 resets latch 452. It also resets the "listen for zeros" latch 442, which depotentializes line 268 which interrupts the regenerative reproduction of the PO-4 and PO-3 pulses (FIG. 3W).

When the "listen for zeros" latch 442 is reset by the TM-3 pulse, the next occurring PO-3 pulse gates the 0 state, via gate 586, to line 270 (FIG. 3V) and thence to OR 368 (FIG. 3V) to fire single shot 366 (FIG. 3U) to produce on OA-5 pulse.

The node has now returned its AP acknowledgement and awaits further command from the sending node. The action of the sending node will be deferred until later. It is assumed that it will respond with an SU command relating to the same data set.

Production of the OA-5 pulse, supra, sets the "listen for message" latch 370 (FIG. 3U). The node now awaits any message coming in on the line. Since it is assumed that an SU command will be forthcoming, the destination will be received at T1-P3 time and recognized by decoder 398 (FIG. 3E). The T1-P3 pulse in the interface is gated to wire 160 which, together with the 1 state of the "listen for message" latch 370, operate AND gate 394 to fire single shot 402 to produce the RM-1 pulse, which gates the output of decoder 398 to line 244 through gate 404 (FIG. 3E), since this is a "my address" destination. Line 244 fires single shot 410 (FIG. 3S) to produce the RM-2 pulse to set the "message absorb" latch 412, thus energizing line 162 immediately.

The energization of line 162 operates on AND gates 164, 172, and 162 (FIG. 3B) to permit these gates to produce readout pulses at T2, T4, and T7 times of the interface to gate out the contents of the interface registers and to insert a blank message character into the destination character space in the manner hereinabove described with respect to the reception of the SP command.

The following registers in the update machine will contain the following characters:
Register 418 — Command SU
Register 416 — Sender Address
Register 414 — Data Set Number
Register 420 — Data Address
Register 422 — First ½ of Data Byte
Register 424 — Second ½ of Data Byte The update machine waits until all the characters have been effectively shifted through the update machine and made available for the foregoing transfers at T4 and T7 times. At T8 time this transfer is complete and that pulse on line 248 (FIG. 3S), together with the 1 state of latch 412 operates AND 432 to fire single shot 434 to produce the RM-3 pulse, which resets the "message absrob" latch 412 (FIG. 3S).

Pulse RM-3 also resets the "listen for message" latch 370 and, on FIG. 3G, opens gate 436 to gate the data set number from register 414 to the memory address register 374. RM-3 initiates RM-4 which causes the control word corresponding to the data set to be read from memory 350 into the memory data register MDR.

Upon the cessation of the RM-4 pulse, single shot 440 is fired to produce the RM-5 pulse, which, on FIG. 3L through OR 382, opens gate 384 to gate the contents of the state register 352-1 of the MDR to the state register 386. The state is now 1 which activates the second horizontal line of the AND gate matrix.

The RM-5 pulse opens gate 790 (FIG. 3I) to gate command in register 418 to decoder 794 to the U vertical line in the matrix. The intersection AND gate produces a U1 output, which on FIG. 3Y, fires single shot 678 to initiate a U1-1 timing pulse.

The U1-1 timing pulse effects five functions as follows:

a. Operates OR 510 (FIG. 3K) to enter a 2 into the state register 352-9 of the MDR 352.

b. Opens gate 498 to emit an AU command (FIG. 3R) to command register 456.

c. Operates OR 568 to open gate 570 (FIG. 3I) to gate the data set number from register 414 to cable 222 and thence to the destination register 454.

d. Operates OR 576 to open gate 578 (FIG. 3I) to gate sender address from register 416 to destination register 454 (FIG. 3S).

e. Opens gate 708 (FIG. 3H) to gate data address from register 420 to the initial data address field 352-11 of the MDR.

Upon cessation of the U1-1 pulse, single shot 680 is fired to produce the U1-2 pulse, which through OR 562 produces a store control to memory 350 which receives the contents of the MDR. U1-2 also sets the "listen for zeros" latch 442 (FIG. 3U) via OR 552.

U1-2 in turn produces U1-3 which tests the "listen for zeros" latch 442 (FIG. 3U) by opening gate 686 with the pulse. Since this latch is 1, line 296 will be active. If 0, line 298 will be active. Line 296 will fire single shot 688 to produce a U1-4 pulse which will in turn produce a U1-3 pulse. The testing for zeros will be regeneratively energized until satisfied, at which time line 298 will return the control to the OA-5 pulse status via OR 368 (FIG. 3V) and single shot 366 (FIG. 3U).

The update machine now awaits an empty message slot to insert its acknowledgement. When next a 0000 appears in register 396 at T1 and P3 of interface time, and a pulse appears on line 160 from the interface at the same time, the "listen for zeros" latch 442 and line 160 open AND 444 to fire single shot 446 to produce a TM-1 pulse. Insertion of the AU acknowledgement from the registers 240, 206, 208, 210, and 212 into the update shift registers and into the line proceeds in the same manner as previously described with respect to the AP acknowledgement.

Completion of data insertion at T7 time is followed by the T8 pulse on line 248 which fires single shot 476 to produce the TM-3 pulse which resets the "listen for zeros" latch 442 and "message transmit" latch 452 which returns the timing to OA-5 as described above.

Subsequent messages to this terminal will all involve the actual updating of data and require communication with the computer. Hitherto, only the interface and update machine have been involved.

The next occurring compatible destination number entered in register 396 at T1-P3 time will be recognized at RM-1 time when line 160 fires single shot 402 (FIG. 3S). The absorption of the message and entry into the appropriate registers will be the same as in the previously described operations. The read message routine with timing pulses RM-1 through RM-5 will again be active.

Figure 30:
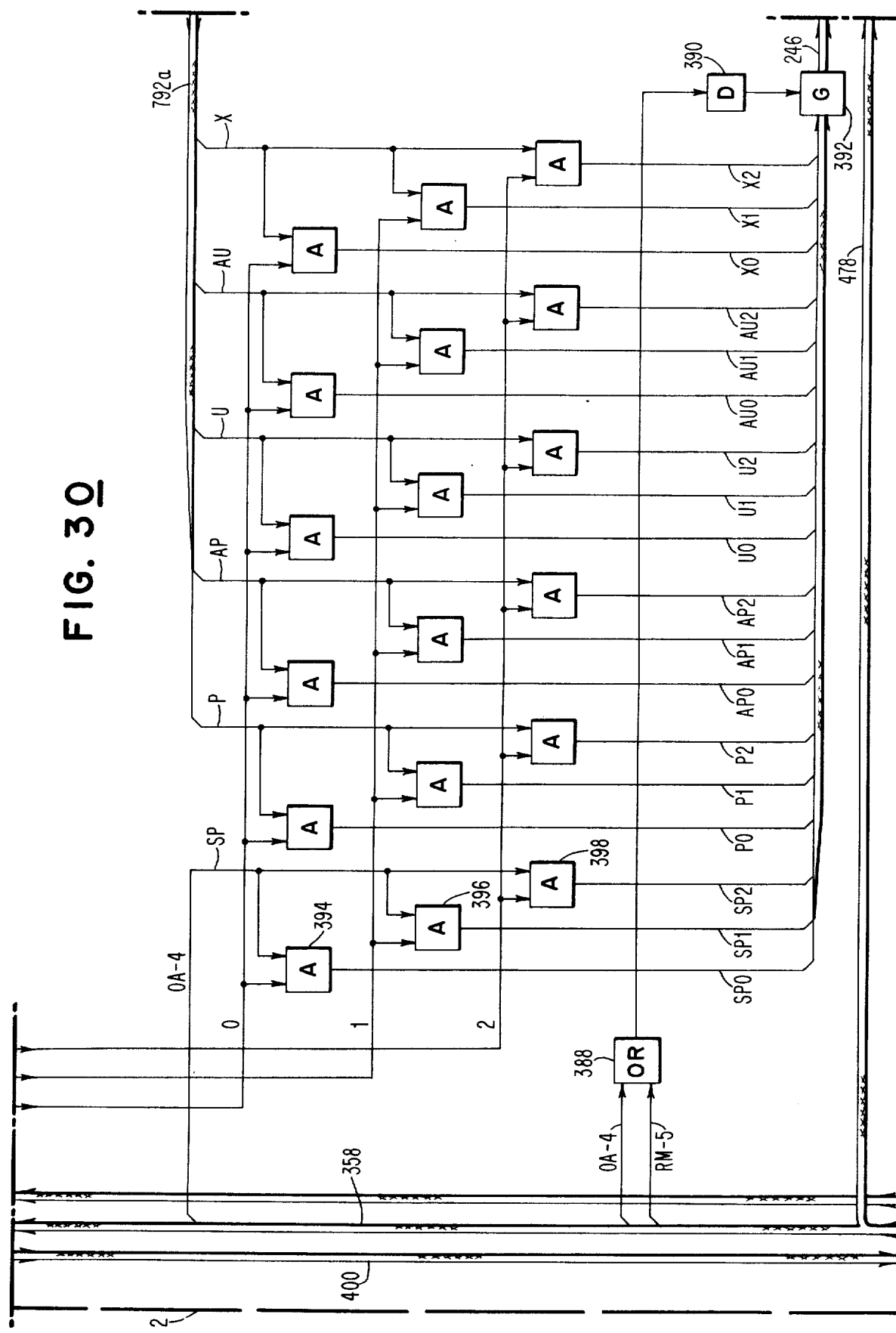

After RM-5 time, there will be a departure from the prior procedures, as data must now be entered into the computer. It is at this time that the state of the node and the nature of the command are examined in the AND matrix of FIG. 30. The state of the node is 2, and the command is an SX or X. This activates th right-hand vertical line X and the lowermost horizontal line 2 to energize the AND gate connected thereto to produce an X-2 pulse to initiate the X-2 sub-routine.

Figure 3V:
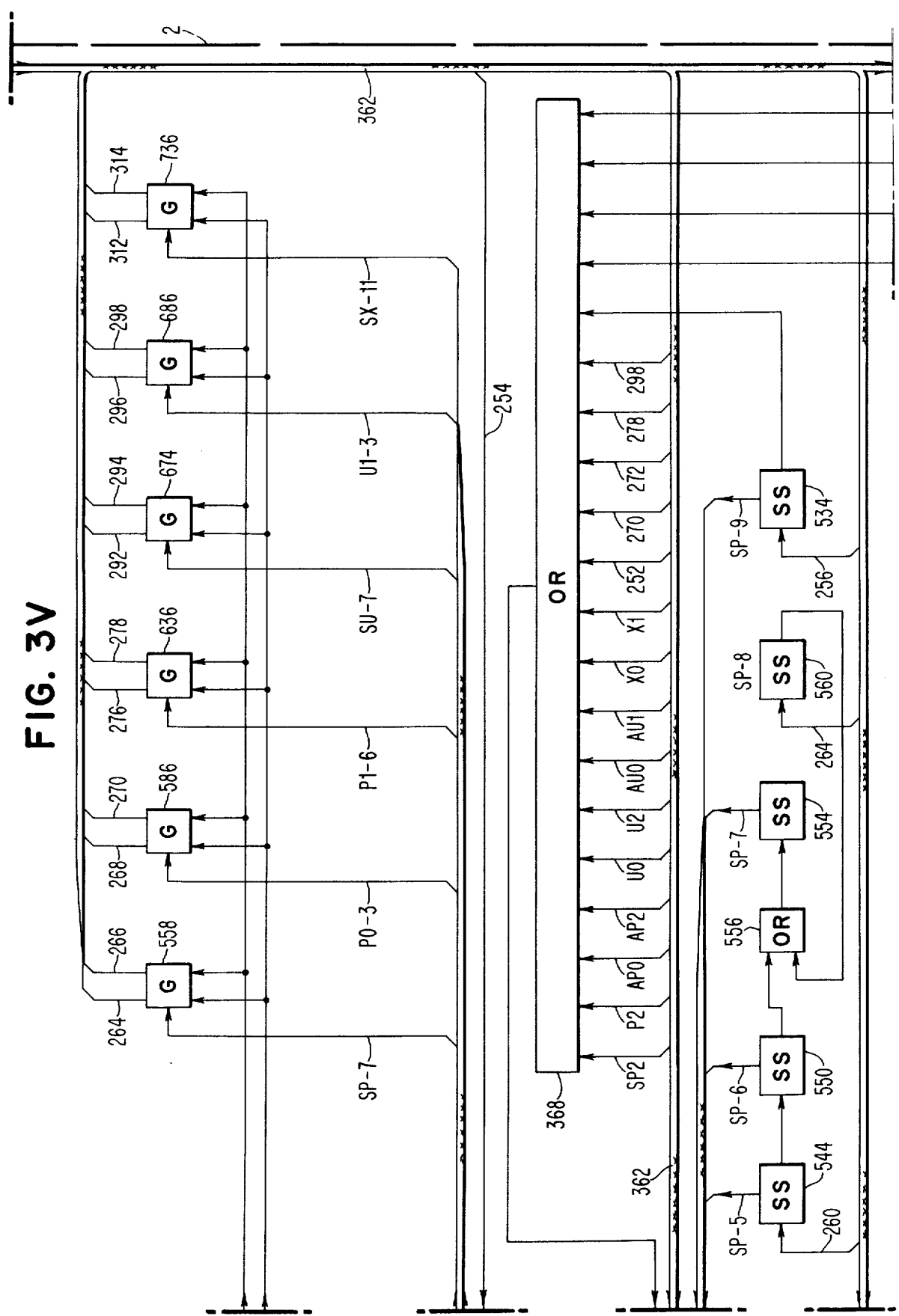
Figure 3W:
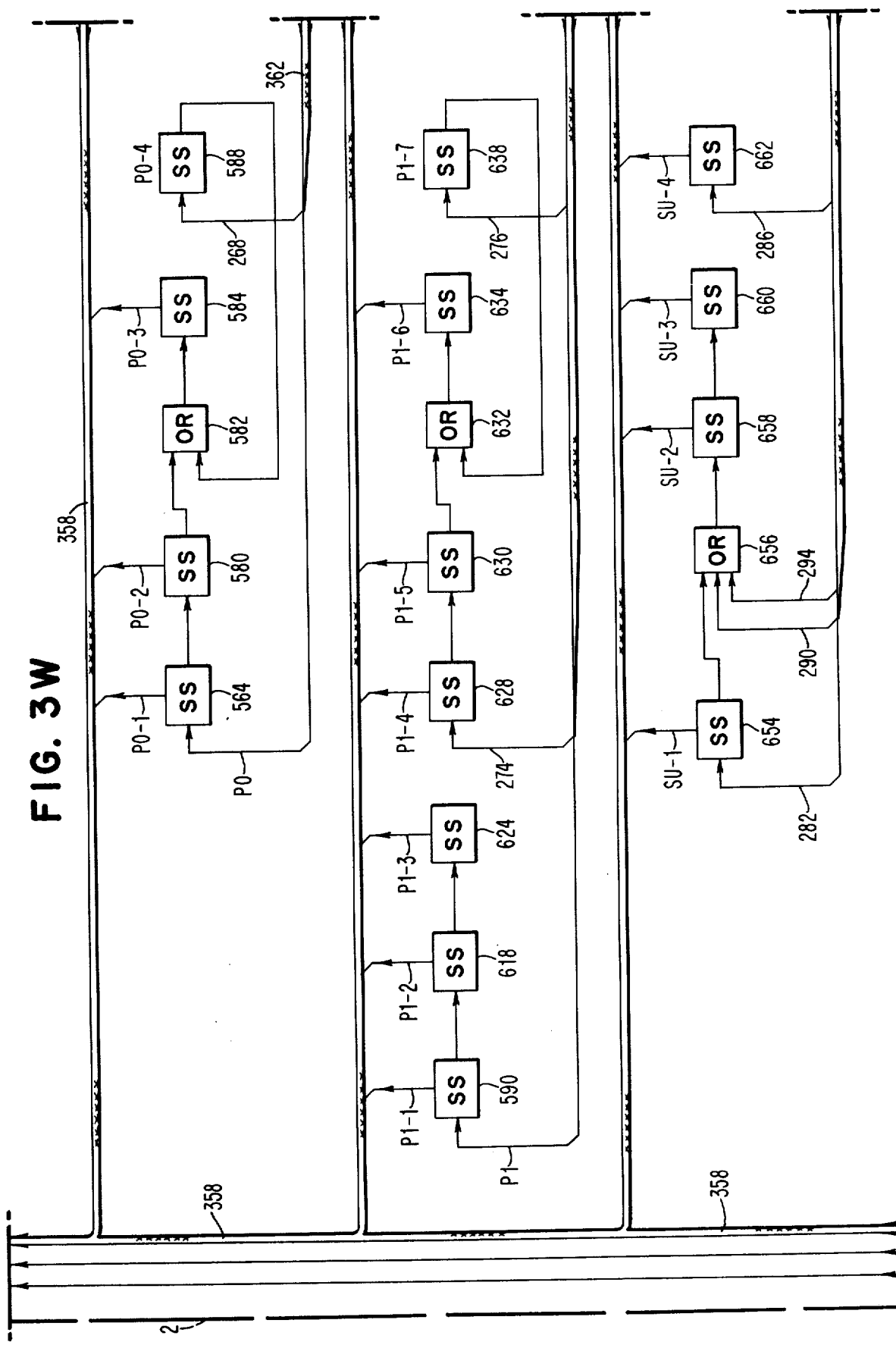
Figure 3Y:
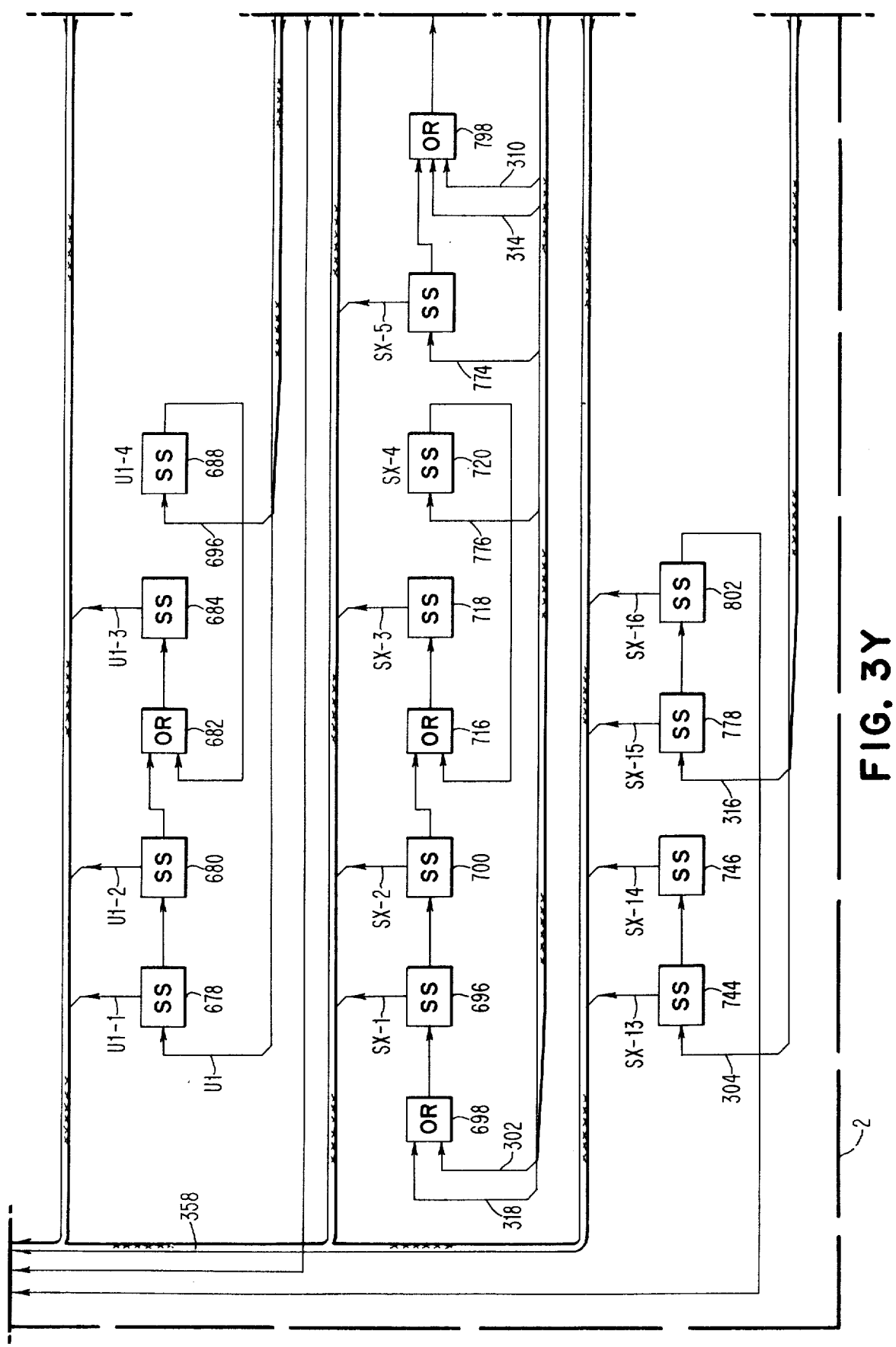
Figure 3Z:
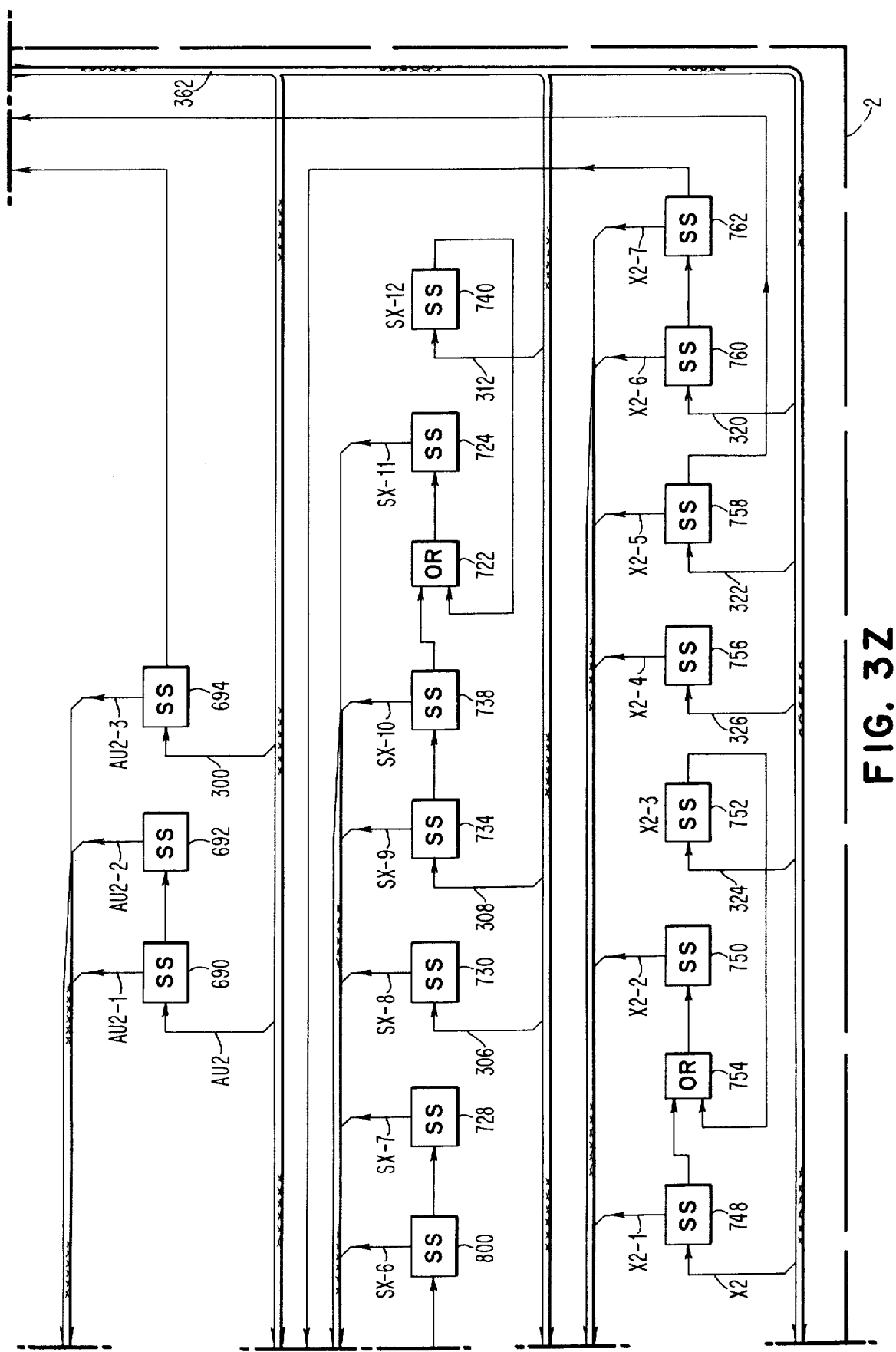

The X-2 cycle starts with the firing of single shot 748 at the bottom of FIG. 3Z to produce the X2-1 pulse. The X2-1 pulse transmits a "take data" signal on line 330 to the computer and sets the "take data" latch (FIG. 3F). The computer responds in accordance with its own cycle time and accepts the data address in register 420 and data in registers 422 and 424 via cable 338. It receives the set number from register 414 via cable 340. When the computer has finished, it returns a "data received" signal on line 332 to reset the "take data" latch (FIG. 3F).

Meanwhile, upon cessation of the X2-1 pulse, the single shot 750 is fired to test the latch by means of the X-2 pulse and gate 770. If the latch is still in the "one" state (no data acceptance), line 324 will be active to fire single shot 752 to produce an X2-3 pulse and in turn X2-2 pulse. This testing will continue until the "take data" latch is reset by the computer and line 326 is potentialized.

Line 326 signifies the acceptance by the computer of this particular byte of data. Since, as explained previously, updating proceeds sequentially from the highest byte to be updated downward to the first byte, it is important to keep track of the bytes which have been updated. Therefore, upon potentialization of line 326, single shot 756 is fired (FIG. 3Z) to produce the X2-4 pulse, which, on FIG. 3H, tests the decoder 712 for "zero or not zero" by opening gate 768. If a zero count is present, line 320 is potentialized. A "non-zero" potentializes line 322. Line 322 ("non-zero" count) fires single shot 758 to produce the X2-5 pulse, which decrements the byte address counter in the MDR by one count. Cessation of the X2-5 pulse activates OR 368 to fire single shot 366 (FIG. 3U) to produce the OA-5, returning the update machine to the standby status where the "listen for message" latch is set to one.

Each subsequent SX command is treated in the same manner, with data being entered into the computer and the computer acknowledging the receipt thereof. For each such acceptance, the byte counter is decremented by one count until it reaches zero. The byte counter is intitially set to the highest byte address when the SU command is transmitted. The receipt of this is acknowledged with an AU response. The receiving node therefore records the highest byte address before it is required to transmit any data to the computer. Therefore, if for any reason the computer cannot accept update data from its update machine thus tying up the update machine while an SX machine progresses through the interface, the SX order will not be absorbed until the computer and the update machine are free to accept it. Conceivably, for example, a node might accept bytes 5 and 4 and then become busy when byte 3 seeks to enter. Byte 3 will be refused and re-entered on the line. Meanwhile, byte 2 will be entered and accepted, followed by byte 1, also accepted. Upon the recurrence of byte 3, it will be accepted and the byte counter finally decremented to zero to finish the transaction. Since each SX order is accompanied by a set number and byte address, the storage into the computer will be properly addressed.

For the chosen example, the progression of events would proceed as follows:

| | | |
|---|---|---|
| SU | - | Set byte counter to 5. |
| AU | - | Acknowledge receipt of command in update machine. |
| SX(5) | - | Receive and enter byte 5 and decrement byte counter to 4. |
| SX(4) | - | Receive and enter byte 5 and decrement byte counter to 3. |
| SX(3) | - | Refuse byte 3 execute order; byte counter remains at 3. |
| SX(2) | - | Receive and enter byte 2 and decrement byte counter to 2. |
| SX(1) | - | Receive and enter byte 1 and decrement byte counter to 1. |
| SX(3) | - | Receive and enter byte 3 and decrement byte counter to 0, thus terminating the transaction. |

As can be seen from the foregoing, the byte counter insures that all bytes scheduled to be updated have, in fact, been received and entered, even though one or more scheduled bytes must necessarily be refused and subsequently accepted.

When all bytes scheduled for update have been received and entered, the byte counter will be decremented to zero, as above described, thus potentializing line 320, signifying completion of the data entry. Line 320 on FIG. 3Z fires single shot 760 to yield an X2-6 pulse, which on FIG. 3K operates OR 506 to reset the state register 352-9 of the MDR to zero. Cessation of the X2-6 pulse fires single shot 762 to yield the X2-7 pulse, which, on FIG. 3I, activates OR 562 to command memory 350 to store the contents of the MDR in accordance with the set number retained in the memory address register MAR. The X2-7 pulse also, through OR 408 (FIG. 3U), fires single shot 354 to produce the OA-1 pulse.

There have been frequent references made to the overall program, whose control pulses are numbered OA-1 through OA-5. It is now timely to examine this cycle in greater detail as it controls the operation of the update machine during standby condition. The immediately preceding reference to the OA-1 pulse resulted from a completion of a data entry operation controlled by the X2 sub-routine. The OA-1 pulse can also be initiated by an SX-16 pulse, resulting from the completion of n "execute change" routine by an initiating node, this routine not as yet having been described. Finally, the OA-1 pulse can be initiated by potentialization of line 242 resulting from the detection of a "not my message" destination from decoder 398 and gate 404 (FIG. 3E).

The OA timing sequence is shown in FIG. 3U, where the OA-1 pulse enters cable 358 and exits on FIG. 3E in gate 360 to test the status of the computer latch 342. If the latch is zero, line 252 is potentialized to operate OR 368 (FIG. 3U) to fire single shot 366 to produce the OA-5 pulse which sets the "listen for message" latch 370 (FIG. 3S).

If the computer latch is in the one state, line 250 will be energized to fire single shot 364, yielding an OA-2 pulse. This means that the computer wants to send out data. Therefore, the OA-2 pulse opens gate 372 (FIG. 3G) to gate the data set number entered into register 344 by the computer into the memory address register 374. Pulse OA-2 initiates OA-3 which causes memory 350 to read out the control word into the MDR. This read signal proceeds through OR 378 (FIG. 3K).

The OA-4 pulse follows the OA-3 upon cessation thereof. It gates the state field from the MDR to the AND gate matrix to determine which of the sub-routines shall be called into action. Thus, the OA-4 chooses a sub-routine. The OA-5 pulse is essentially a no-operation standby control.

Resolution of Conflicts at a Slave Node

The simple case of the reception of the send prepare, send update, and execute commands and the operation of the update machine in response thereto has been described in detail. There remains, however, the resolution of conflicting commands. These arise in one of two ways: (a) a node receives instructions from two different nodes to prepare to update the same data set, or (b) a node receives instructions to prepare to update the same data set for which its own computer has a call to update. The first situation will first be examined.

It will be assumed, by way of example, that node 3 receives instructions from nodes 1 and 4 to update the same data set, that with respect to this data set, node 4 has a higher priority than node 1, and that node 1's instructions are received at node 3 before those from node 4.

Returning now to the initial reception of the first occurring message for node 3, which in the chosen example is an SP command originated by node 1 addressed to node 3. The destination will be entered into the destination address register at T1-P3 time of the interface module and detected as a "my address" at RM-1 time of the interface. The subsequent "read message" control pulse will set the "message absorb" latch to allow the SP message from node 1 to be entered into the update registers. When entry is complete, the "listen for message" and the "message absorb" latches will be reset and the data set number gated into the memory address register.

The control word from memory is now read into the memory data register. The state register and command are gated to the AND matrix to initiate a P0 sub-cycle as hereinabove described. A blank message character will have been inserted in the message slot.

The same P0 sub-cycle as hereinabove described will, as before, alter the information in the memory data register to introduce the address of the original sender (node 1 in this example) and the node state as 1. Also, the update machine will await a blank message slot and return an AP acknowledgement from node 3 to node 1 with respect to this data set.

It is to be noted that while node 1 is awaiting a blank message slot to return its acknowledgement, it cannot absorb any further messages, even though addressed of it. This is true because on FIG. 3U the "listen for zeros" latch 442 is set and the "listen for message" latch 370 is reset. These are mutually exclusive, as the machine can only "listen for zeros" or "listen for message," but not both. Thus, when line 160 is potentialized, only a TM-1 pulse can be produced to test the destination address for zeros. Once the command is sent out, the machine is conditioned to "listen for message."

Assuming that the AP acknowledgement has been sent to node 1 and that node 3 now receives the same SP command from node 4, it responds with an RM routine which reads the set control word from memory into the memory data register. It also enters that node state and command into the AND matrix. The inputs to the matrix (FIG. 3O) are now P and 1. This actuates the AND at the intersection of these lines to yield a P1 sub-routine. This was initiated because two nodes (1 and 4) demanded the same service of node 3. The conflict must be resolved.

The P1 pulse (and in fact all sub-routine calls) are gated out of the AND matrix by gate 392 (FIG. 3O) at RM-5 time and into cable 246 to exit on FIG. 3W to fire single shot 590 to produce the P1-1 pulse. This pulse opens gate 592 (FIG. 3I) to gate the decoded address of this sender (node 4) from decoder 594 to gate 602 to gate out the priority of node 4 with respect of this data set from the MDR to cable 608 and gate 610 (FIG. 3R) now open at P1-1 to enter the current priority in register 614.

P1-2 comes up upon cessation of P1-1 and opens gate 620 (FIG. 3M) to gate the decoded address (number 1) of the previous sender to open gate 596 which gates the priority number of node 1 in the MDR to gate 612 (now open) and the previous priority register 616 (FIG. 3R).

The priority registers 614 and 616 are compared. Since the assumed example gave node 4 a higher priority than node 1, the compare unit will produce an output of "previous < current," or, paraphrased, priority of 1 is less than priority of 4. This relationship is gated out at P1-3 time, which follows P1-2, upon line 274. Line 274 terminates on FIG. 3W at single shot 628 to produce the P1-4 pulse. This initiates an acknowledgement AP message for node 4. P1-4 opens gate 494 (FIG. 3Q) to gate an AP command from emitter 493 to command register 456. It also opens gate 570 (via OR 568) to gate the data set number from register 414, via cable 222 to register 460. P1-4 also gates the current sender's address in register 416 to the current sender field of the MDR by opening gate 574 (FIG. 3I) via OR 572. Finally, P1-4 gates the current sender's address in register 416 to the destination register 454 by opening gate 578 at this time by means of OR 576.

P1-5 follows P1-4 and stores the content of the MDR back into the memory 250, having replaced mode 1 with node 4 as the latest sender. P1-5 sets the "listen for zeros" latch. As soon as a "zero" is found, the TM routine is initiated to send an AP message from node 3 to node 4. The "listen for zeros" latch, in conjunction with the T1-P3 potential from the interface unit, initiates the TM cycle to test for "zeros" and inject the AP message on line when a blank message slot is found.

It is to be noted that node 3 has sent an AP message to both nodes 1 and 4, even though node 4 has a higher priority. However, node 1 was also sending an SP command to node 4 for the same data set. Since node 4 has a higher priority than node 1, it will not respond with an AP order. Therefore, node 1, since it does not have an AP response from all nodes to whom it sent SP orders, will not send out any SU commands. On the other hand, node 4 sent SP commands to both nodes 1 and 3. Both nodes respond with an AP acknowledgement. Node 4 can, therefore, proceed with an SU command to both nodes 1 and 3. The check off procedure at a message originating node will be treated later.

Returning now to node 3, let it be assumed that the SP command from node 4 is received before the SP command from node 1. The AP response will be produced and returned to node 4 by node 3. However, when node 3 receives the same request from node 1 and compares the priorities it will respond with the previous (node 4) > current (node 1). This will potentialize line 272 (FIG. 3R) to produce a "no operation" output from OR 368 (FIG. 3V) to fire single shot 366 and produce the OA-5 pulse, which sets the "listen for message" latch. Node 3 will therefore not return an AP message to node 1 and it will be estopped from further activity with respect to this data set in which it has a conflicting lower priority.

There is another variation of the resolution of conflicts that must be resolved. Now let the following set of conditions be assumed:

a. Node 1 sends out an SP command to nodes 3 and 4.

b. Both nodes 3 and 4 respond with an AP acknowledgement to node 1.

c. Node 1 sends out out an SU command to nodes 3 and 4.

d. Node 4 sends out an SP command to nodes 1 and 3 before it receives the SU command from node 1.

With respect to node 3, only the SP message from node 1 is absorbed and written into memory. The AP message is returned. The SU command is received and written into memory and changes the node state of node 3 to a 2. This, as previously explained, initiates a U1 routine to send back an AU acknowledgement, in this case from node 3 to node 1.

If now an SP command from node 4 is received, it will be absorbed and entered into the registers of the update machine by T7-P3 time of the update machine. At RM-5 the AND matrix will be activated with a P line and a 2 input to initiate a P2 output, gated into cable 246 at RM-5 plus delay 392 to produce a no-operation output from OR 368 to fire single shot OA-5 (FIG. 3U). Thus, the receipt of an SP command of high priority after receipt of a SU command of low priority will be ignored. It will not be written into memory. Effectively, at node 3 the tardy SP order from node 4 will be ignored.

In summary, while a node is in the 1 state, it can receive and process conflicting commands. Once it achieves the 2 state, it is committed to go forward with the node which caused it to achieve that state. The 0 state connotes no pending business at the node. The state of the node is with respect to each data set. A node may operate sequentially on different data sets. It is, however, busy if it is awaiting a blank message slot in which to insert a command, even through the command relates to a different data set.

All of the foregoing discussion has been confined to the reception of updating commands, the acknowledgement thereof, the entry of corrected data into the computer, and the resolution of conflicts by a receiving node. Discussion will now be had of the operation of a node when it is the originator of an update order.

Initiating an Update at a Master Node

Any node which initiates an order for updating must receive a signal from its associated computer. This signal originates on line 334 (FIG. 3F), connecting the computer with the updating machine and sets the computer latch 342 to the 1 state, signalling that the computer desires to be served. At OA-1 time of the update machine, the computer latch is tested by means of gate 360 to produce a potential on line 250 to fire single shot 364 (FIG. 3U) to produce the OA-2 pulse. This pulse opens gate 372 to enter the data set number from register 344 (FIG. 3F) into the memory address register 374, the set number having been entered from the computer concurrent with the signal on line 334. The data address is entered in register 346 at that time also.

OA-3 follows OA-2 and causes OR 378 (FIG. 3K) to read the control word from memroy 350 into the memory data register. The next following OA-4 pulse gates the state field in the MDR, via OR 382, gate 384 to state register 386. The decoding AND gates connected thereto potentialize the 0 line to the AND matrix. The OA-4 pulse produces the vertical input to the matrix by potentializing the SP line. The coaction of these two lines (SP and 0) produces an SP-0 pulse to initiate that sub-cycle.

The SP sub-cycle is controlled by the single shots shown on FIGS. 3U and 3V. The SPO pulse from the AND matrix fires single shot 400 to produce the SP-1 pulse.

The SP-1 pulse performs the following functions:

a. Resets shift register 480 (FIG. 3N) via OR 484.

b. Resets counter 482 (FIG. 3P) via OR 486.

c. Gates P command (FIG. 3Q) via gate 492 to command register 456.

d. Gates data set number in register 344 via OR 501 and gate 504 to cable 222 and set number register 460 (FIG. 3T).

e. Sets state field 352-9 in MDR to 1 by means of OR 508 and encoding OR gates attached thereto.

f. Gates data set sharing vector from MDR to shift register 480 by means of OR 512 and gate 514 (FIG. 3M).

g. Gates data set sharing vector from MDR to check off field 352-10 of MDR by means of OR 516 and gate 518 (FIG. 3K).

h. Gates local address from hard-wired emitter 458 (FIG. 3S) via gate 520 (FIG. 3R) to the address field 352-1 of the memory data register MDR.

Control pulse SP-2 follows SP-1, coupling being effected through OR 524 to fire single shot 526 to produce this pulse. SP-2 shifts the data in the shift register 480 (FIG. 3N) one bit position to the left upon each occurrence thereof and simultaneously increments the counter 482 by one count. The SP-2 pulse passes through OR 488 and OR 490, respectively, to effect these functions. The purpose of the shift and count is to identify the nodes to which the commands are to be sent. The shift register contains the data sharing vector which is a six-bit number with ones in the bit positions corresponding to the nodes sharing the data set number. It is noted that shift register 480 has seven bit positions. Thus, upon the first shift, node 1 is shifted into the seventh or test position and the counter 482 incremented to a one count. If node 1 has a 1 in the data sharing vector signifying that it shares this data set, then a 1 will be shifted into the seventh bit position, and a 1 will be counted in the counter.

Counter 482 is connected to AND 483 which yields an output if counter 482 registers a count of seven, and an output, through inverter 485, if not seven. At SP-3 time, which follows SP-2, gate 528 (FIG. 3P) is opened to gate the seven signal to line 256 or not seven to line 258. Assuming that the node is just starting, a not seven signal will appear on line 258 which, on FIG. 3U, fires single shot 536 to produce the SP-4 pulse. This pulse now tests the seventh bit position of the shift register for a 1 or 0. This is effected via gate 538 which potentializes line 260 if a 1 or line 262 if a 0. If a 0 is present and line 262 is potentialized, OR 524 (FIG. 3U) will refire single shot 526 to repeat the SP-2 pulse to cause another shift and another incrementing of the counter and a further test for seven (SP-3). This shifting and incrementing will continue until a 1 is detected in the shift register by a potential on line 260. When this occurs, single shot 544 (FIG. 3V) will be fired to produce an SP-5 pulse.

The SP-5 pulse via OR 546 and gate 548 (FIG. 3P) gates the count in counter 482 to cable 224 and to the destination register 454 (FIG. 3S). The count corresponds to the node number having a one in the data sharing vector position corresponding to that node. The SP-6 pulse follows SP-5 and sets the "listen for zeros" latch 442 (FIG. 3U) via OR 552 and, upon cessation, fires single shot 550 to yield the SP-7 pulse.

The SP-7 pulse opens gate 558 to test the status of the "listen for zeros" latch 442. If it is zero, line 266 will be hot to operate OR 524 to cause another shift and counter incrementing and subsequent operations caused by SP-2, SP-3, SP-4, SP-5, and SP-6 as hereinabove described. The reset of the "listen for zeros" latch is effected upon completion of a message insertion.

Since the "listen for zeros" latch is now set, line 264 will be hot at SP-7 time to fire single shot 560 (FIG. 3V) and cyclically refire single shot 554 to repeat SP-7 until the message can be inserted.

The line 160 is potentialized at every T1-P3 time of the interface module. With the "listen for zeros" latch 442, set, AND 444 (FIG. 3U) will be active at this time to test the contents of the destination register 398 for zeros. If present, line 254 will be potentialized to continue the TM (transmit message) routine in the same manner as hereinabove explained with respect to the receiving nodes returning an acknowledgement. The command now, however, will be an SP command.

Upon completion of insertion of message at T7 time of the interface, T8 will follow to potentialize line 248 to fire single shot 476 (FIG. 3U) to produce the TM-3 pulse which resets the "listen for zeros" latch 442 and "message transmit" latch 452. As hereinabove explained, the SP-7 pulse is repetitively produced to test the "listen for zeros" latch. Since it is now reset, the SP-7 pulse via OR 558 (FIG. 3V) will potentialize line 266, which, as also explained, will re-initiate SP-2 and subsequent pulses to repeatedly shift the data sharing vector until a one is found. The next node address is extracted from the node counter and entered into the destination register. Repeated SP messages are sent out for each node having a one in the data sharing vector. It is noted that the originating node has no one even though it shares the data set. A zero in this node position prevents the node from sending a message to itself while preserving the synchronism of the shift and count node address generation.

When the count in the node counter 482 reaches seven, signifying that all nodes have been shifted, tested, and serviced (if required), the SP-3 pulse which, as explained, occurs upon every completion of message transmission to open gate 528 (FIG. 3P) to gate the sevens signal to line 256 to fire single shot 534 (FIG. 3V) to produce the SP-9 pulse. This final pulse stores the contents of the MDR into memory 350.

The originating node now awaits the return of AP acknowledgements from all of the nodes to which it sent SP commands. It can proceed only if all return acknowledgements. As explained, if conflicts exist, AP returns will not be made in some instances. The no-conflict condition will be treated first.

Upon cessation of the SP-9 pulse, OR 368 (FIG. 3V) will be active to fire single shot 476 to produce the OA-5 pulse to set the "listen for message" latch.

An update originating node operates in the same manner as an update receiving node in absorbing a message from the line and entering it into its receiving registers and in calling forth the control word from memory and entering it into the memory data register. It is at this point that the procedure employed by an initiating node departs from that of a receiving node, principally because of the need for checking off the acknowledgements. It is at this point of departure that the discussion will be now taken up.

With the "listen for message" latch set, any acknowledgement from a receiving node addressed to the sending node will initiate a "receive message" sub-routine which as hereinbefore described, will cause the message to be absorbed by the initiating node and entered into the respective registers 418, 416, 414, 420, 422, and 424. This entry will be complete by T7-P3 time of the interface module. At RM-5 of the "receive message" timing, the state field of the MDR and the command are gated to their respective decoders and to the AND matrix. Since an AP response is forthcoming together with a 1 node state, the AP-1 output from the AND matrix is energized. This is the point of departure from previous routines.

The AP-1 signal initiates the AP-1 timing sequence shown on FIG. 3X where it fires single shot 640 to yield the AP1-1 pulse. This AP1-1 pulse operates OR 642 (FIG. 3I) to open gate 644 to gate the decoded sender's address from decoder 594 to reset the corresponding node bit in the check off field 352-10 of the MDR. This field contains a 1 in every bit position corresponding to a node sharing the data set being processed.

When the node bit is checked off by pulse AP1-1, the pulse AP1-2 checks the status of the "check offs" by opening gate 648. The ANDED outputs of 0's from the check off register and the inverse thereof are gated to lines 282 and 280, respectively. If the check off is incomplete (line 280 hot), single shot 652 (FIG. 3X) will be fired to produce the AP1-3 pulse which stores the contents of the MDR back into memory in anticipation of the missing acknowledgements. Upon the receipt of each subsequent acknowledgement, its node bit will be checked until none remains.

With check off complete, the AP1-2 pulse through gate 648 (FIG. 3N) will produce an all zeros pulse on line 282 which will initiate the SU (send update) routine by firing single shot 654 (FIG. 3W) to yield the SU-1 pulse.

The SU-1 pulse effects the following:
a. Resets shift register 480 via OR 484.
b. Resets address generation counter 482 via OR 486.
c. Gates the U command from emitter via gate 496 to command register 456.
d. Gates the data set number from register 344 via gate 504, opened by OR 501 to cable 222 and register 460 (FIG. 3T).
e. Sets the state field in the memory data register to 2 by means of OR 508 and associated encoding unnumbered OR gates (FIG. 3K).
f. Gates the data set sharing vector from the MDR to shift register 480 by means of OR 512 and gate 514 (FIG. 3M).
g. Gates the data sharing vector from the MDR field 352-2 to the check off field 352-10 by means of OR 516 and gate 518 (FIG. 3K).
h. Gates the data address from register 346 through gate 706 (opened by OR 502) to cable 228 and to data address register 462.

SU-1, upon termination, fires single shot 658 yielding SU-2, which shifts the shift register 480 one bit position and increments the counter 482 one count. This is the same type of shift and look as employed in the SP sequence. SU-3 following SU-2 tests the counter 482 for 7. If not 7, line 286 is potentialized, firing single shot 662 to produce SU-4. Pulse SU-4 opens gate 540 (FIG. 3N) to test the shifted bit in shift register 480 for 0 or 1. If 0, line 290 is hot to fire single shot 658 via OR 656 to repeat the shift, count, and test routine until a 1 is detected. This 1 test at SU-4 potentializes line 288 to fire single shot 666 to yield the SU-5 pulse, which pulse gates the output of the counter 482 by means of OR 486 and gate 548 to cable 224 and destination register 454 (FIG. 3S).

SU-6 follows SU-5 and sets the "listen for zeros" latch 442 via OR 552 in preparation for sending an SU command. Upon termination of SU-6, single shot 672 is fired to yield SU-7 which tests the "listen for zeros" latch for 0 or 1. This latch remains in the 1 state until the message is successfully inserted. Therefore, SU-7 and gate 674 produce a potential on line 292 which fires single shot 676 to produce SU-8 which in turn regenerates SU-7. This test and regeneration continue until the message is transmitted under control of the TM routine in the identical manner in which all messages are inserted into the line.

When the "listen for zeros" latch is finally reset at TM-3 upon completion of message insertion, the SU-7 pulse will open gate 674 (FIG. 3V) to find a 0 and render line 294 hot. This reactivates the SU-2 pulse by firing single shot 658 via OR 656 (FIG. 3W) to cause the shift, increment, and test routines of the contents of shift register 480 and counter 482. All nodes having a 1 in the shift register are detected, and an SU message sent thereto in the identical manner just described. The "listen for zeros" latch is tested at SU-7 following each transmission of a message.

When all scheduled SU messages have been transmitted, the SU-2 pulse will shift all node markers out of the shift register 480 and increment the count in counter 482 to 7. When it is tested at SU-3 time by means of gate 530, line 284 will be hot to fire single shot 664 to yield the SU-9 pulse. This pulse, through OR 562, puts the contents of the MDR back into memory.

The "listen for message" latch is set, as before, in readiness for acknowledging orders from the addressed nodes. These are received under control of the RM (receive message) routine as heretofore described in several instances. The response is entered as before in the receiving registers 214, 216, 218, 414, 416, and 418. The corresponding control word is entered into the MDR. As before at RM-5 time, the decoded command and the node state are gated into the AND matrix by means of gate 790 (for the command) and gate 384 through OR 382 (for the node state). This results in the AU line and the 2 line being hot to operate the AU2 AND gate to produce an AU2 output which on FIG. 3Z fires single shot 690 to produce the AU2-1 pulse. Like the AP1-1 pulse, this pulse operates OR 642 (FIG. 3I) to open gate 644 to gate the decoded sender's address from register 416 and decoder 594 to cable 234 to reset the appropriate bit in the check off register. The immediately following AU2-2 pulse opens gate 650 to test for "all zeros" or "not all zeros." If "not all zeros," line 300 will be hot. If "all zeros," line 302 will be hot. Line 300 fires single shot 694 to yield an AU2-3 pulse which restores the control word in memory 350 and operates OR 368 to fire single shot 366 to produce the OA-5 pulse.

If line 302 were hot, signifying "all zeros" and receipt of all requisite replies, single shot 696 (FIG. 3Y) would be fired to yield an SX-1 pulse and initiate an SX routine, or execute change. The SX commands are again addressed to the same nodes and now include the data to be updated. Not only must a separate SX message be addressed to each affected node, but also a separate message to each node for each separate byte of data to be updated. This requires that both the nodes and the data addresses be kept track of in comparing the commands.

The SX-1 pulse resets shift register 480 by means of OR 484 and counter 482 by means of OR 486. It also gates the X command from the emitter by opening gate 500 to enter the requisite bits into the command register 456. The data set number in register 344 is gated via gate 504 opened by OR 501 at SX-1 time to register 460 (FIG. 3T). Finally, the SX-1 pulse gates the data sharing vector from the MDR into the shift register 480 by means of OR 512 and gate 514. The MDR has retained the set control word entered at RM-4 time of the receive message sequence and retained because the acknowledge update (AU) sequence detected "all zeros" in the check off field which skipped the AU2-3 "store control" and initiated instead the execute change routine and SX-1.

SX-2 follows SX-1 and signals the computer on line 784 that it wants a byte of data, setting the "ask data"

latch 796 (FIG. 3H) with the same pulse. SX-3 follows SX-2 (FIG. 3Y) and tests the "ask data" latch for a 1 or 0. This is effected via gate 798 (FIG. 3J) yielding potential on line 774 (0) or 776 (1). The purpose of this test is to allow the computer time to respond and suspend operation of the update machine until it does. Line 776 fires single shot 720 (FIG. 3Y) to regenerate the SX-3 test pulse until the computer enters the first byte on cable 788 and into the registers 464 and 466 and resets the "ask data" latch by a signal on line 786. The next SX-3 test pulse will produce a 0 signal on line 774 to fire the single shot yielding the SX-5 pulse, which pulse gates the data address in register 346 by means of OR 502 and gate 706 to cable 228 to data address register 462 (FIG. 3T).

SX-6 follows SX-5 and shifts the data sharing vector in shift register 480 one bit position and increments the counter 482 one count. This follows respectively from operation of OR 488 and OR 490 by the SX-6 pulse. The next pulse, SX-7, follows automatically and as in previous cases tests the counter for 7 by means of gate 532 to potentialize line 306 for "not seven" or line 304 for "seven." Since the routine has just started, line 306 will be hot to fire single shot 730 yielding the SX-8 pulse.

The SX-8 pulse checks the left-hand bit in the shift register for 0 or 1. If 0, line 310 will be hot to fire single shot 800 to produce in turn SX-6 and SX-7 to respectively shift and increment and test for a 7. No seven initiates SX-8 which again tests for a 1 in the shift register. This shift, increment, and test continues until a 1 is in the shift register. The resulting hot line 308 fires single shot 734 to yield the SX-9 pulse.

The SX-9 pulse gates the output of counter 482 to the destination register 454 by opening gate 548 through OR 546. SX-10 follows immediately and sets the "listen for zeros" latch 442 by means of OR 552.

The SX-11 pulse tests the "listen for zeros" latch 442 by applying this pulse to gate 736 and, finding it to be a 1, as it now will be, potentializes line 312 which fires single shot 740 (FIG. 3Z) to produce the SX-12 pulse, which in turn fires single shot 724 to yield the SX-11 pulse to again test the "listen for zeros" latch. This will be repeated until the latch is reset at TM-3 time following a completion of insertion of the SX command on the line.

With the "listen for zeros" latch 442 set to 1, the signal on line 160 at T1-P3 time of the interface module will detect a zero destination address when it appears on the line. This will initiate a "transmit message" order in the manner described heretofore in several instances. The SX message will be inserted on the line in the identical fashion that all messages are inserted. Upon completion of insertion and potentialization of line 248 at T8 time, the TM-3 pulse will be produced to reset the "listen for zeros" latch 442 and the "message transmit" latch 452.

The repetitive production of the SX-11 and SX-12 pulses, as hereinabove described, will, upon the opening of gate 736 at SX-11, find the 0 state of the "listen for zeros" latch to render line 314 hot. Line 314, via OR 798 fires single shot 800 (FIG. 3Z) to yield the SX-6 pulse. SX-6 shifts the data sharing vector in the shift register 480 one bit position and increments the counter 482 by one count. SX-7, following immediately, tests the counter for 7. If "not seven," SX-8 is initiated as hereinabove explained to test the shifted bit for a 1. The SX-6, SX-7 and SX-8 pulses are repeated until a 7 is detected or a 1. The detection of a 1 initiates pulses SX-9, etc. to insert a message on the line.

The foregoing operation is continued until a 7 is detected in the data sharing vector shift counter 482. This signifies that all nodes have had an SX command sent to them with respect to this data set and this data byte. It is now necessary to check to see if all the required data bytes have been sent.

If at SX-7 time when the shift counter 482 is tested, a 7 is found, line 304 will be energized to fire single shot 744 to initiate pulse SX-13. Pulse SX-13 decrements the data address counter 346 (FIG. 3H) so as to access the next lower data byte, if needed. SX-14 follows SX-13 and, on FIG. 3H, opens gate 742 to test the decoder 710 for 1111 or $\overline{1111}$. This determines whether the data sets have all been transmitted. There are sixteen bytes of data, which in binary will produce a data address of 1111. However, even if the highest byte to be updated were sixteen, the register 346 would be decremented before being tested. Therefore this test will detect 1111 only after the counter has been decremented through zero and back to 1111.

The $\overline{1111}$ signifies that at least one further byte of data remains to be updated. Therefore, the $\overline{1111}$ test energizes line 318 which on FIG. 3Y activates OR 698 to fire single shot 696 to produce the SX-1 pulse. As previously explained, the SX-1 pulse (a) resets the shift register 480 and counter 482 (b) gates the X command to the command register (c) gates the data set number to the data set number register, and (d) gates the data sharing vector to the shift register 480. Steps (b) and (c) are redundant, as they are only loading what is already in the registers. The circuitry is simplified by not separating these operations.

The SX sub-routine is repeated for this new byte address for each affected node. The node address is again decremented and the nodes sequenced to produce a message for each.

When finally at SX-14 the count in counter 482 is found to be 1111 and line 316 energized, single shot 778 (FIG. 3Y) will be fired to produce the SX-15 pulse, which sets the state field in the MDR to zero, by means of OR 506 (FIG. 3K). SX-16 follows SX-15 and stores the contents of the MDR back into memory to terminate the send execute sub-routine and resets the computer latch 342 (FIG. 3E). It also fires the OA-1 single shot to initiate a test of the computer latch.

It is to be noted that the registers 344 and 346 are cable-connected to the computer by individual cables. Each request for data from the computer is initiated by an SX-2 control pulse on line 784. This request remains until the computer responds with data for the registers and resets the "ask data" latch 796. The SX routine in the update machine is held up until the computer responds. Local controls within the computer will fit the request for data among its other chores.

To summarize the sending of execute change commands, let it be assumed that node 1 desires to update the bytes of data in address locations 3, 2, and 1 in nodes 3, 5, and 6. The SX routine will be repeated nine times to send this data as follows:

```
Cycle No. 1  Update byte 3 in node 3
             Update byte 3 in node 5
             Update byte 3 in node 6
             Update byte 2 in node 3
             Update byte 2 in node 5
             Update byte 2 in node 6
             Update byte 1 in node 3
```

-continued

Update byte 1 in node 5
Update byte 1 in node 6

Resolution of a Conflict at a Master Node

The simple case of the initiation of an update by a master node without conflict has been explained. So, too, has the resolution of conflicts at a slave node been explained. It is now appropriate to examine the resolution of a conflict at a master node. To facilitate the explanation, the following fact situation will be assumed:
a. Nodes 1, 3, 5, and 6 share the same data set.
b. Nodes 1 and 5 both have requests from their respective computers to update the same data set.
c. Node 5 has a higher priority than does node 1 with respect to this data set.
d. Node 1 starts its operation before node 5.
e. Node 5 has received its SP command from node 1 and has returned its AP acknowledgement to node 1.
f. The computer at node 5 requests service from its associated update machine while it is preparing and sending the AP acknowledgement to node 1.

The receipt by node 5 of the SP command, the processing of it in the update machine, and the preparation and return of the AP acknowledgement to node 1 are identical to the same operations in any slave machine. These involve the utilization of the RM routine to receive the message, the PO sub-routine to prepare the AP acknowledgement, and the TM routine to transmit the acknowledgement.

At the completion of the "transmit message" routine, the control word for the involved data set has been returned to memory in node 5 with the state as 1 and the last sender recorded as node 1. The TM-3 pulse which terminates the transmit message routine has reset the "listen for zeros" and the "transmit message" latches. Meanwhile, the PO-3 and PO-4 impulses have been repetitively regenerating, with the PO-3 pulse testing the "listen for zeros" latch for a 0.

Upon reset of the "listen for zeros" latch 442 (FIG. 3U) at TM-3, the next occurring PO-3 pulse will open gate 586 to gate the 0 state of latch 442 to line 270 which via cable 362 operates OR 368 (FIG. 3V) to energize single shot 336 to produce the OA-5 pulse.

The OA-5 pulse sets the "listen for message" latch 370 (FIG. 3U) which conditions the unit to be receptive (via AND 394) to the pulse on line 160 at T1 time, when the destination is gated to destination register 396, to fire single shot 402 to yield the RM-1 pulse. This pulse opens gate 404 to test the destination. If we assume that node 5, having just received an SP command from node 1, will not have a new message addressed to it until node 1 has sent out all of its SP commands and all of the affected slave units will have responded with their acknowledgements, then the next message on the line will not be addressed to node 5. Therefore, at RM-1 when the destination register is tested, it will produce a "not my address" signal on line 242 (FIGS. 3E and F). Line 242 activates OR 408 (FIG. 3U) to fire single shot 354 to produce the OA-1 pulse.

Since we have assumed that node 5's computer has requested update service, it will have produced a signal on line 334 to set the computer latch 342 (FIG. 3E) prior to this time. Now at OA-1 time, gate 360 is opened to find the latch in the 1 state to potentialize line 250, which on FIG. 3U fires single shot 364 to produce the OA-2 pulse. The computer, in requesting service, also loaded the data set number into register 344 and the data address into register 346. Therefore, at OA-2 time, gate 372 (FIG. 3G) is opened to gate the data set number from register 344 to the memory address register 374. Pulse OA-3, following thereafter, activates OR 378 to fetch the control word for this data set from memory. This word has the state as 1 and address of node 1 as the initiating sender.

The next following pulse, OA-4, opens gate 384 (FIG. 3L) to potentialize the 1 line in the AND matrix and also potentializes the vertical SP line directly. The output from AND 394 activates line SP1, which by means of OR 388, delay 390, and gate 392 activates that line in cable 246. The SP1 line and the pulse thereon fire single shot 589 (FIG. 3X) to produce an SP1-1 pulse. This and subsequent SP1-2 and SP1-3 pulses determine the priority of this node and node 1.

The SP1-1 pulse potentializes OR 603 (FIG. 3L) to open gate 604 to gate the priority of this node (node 5 in the example) to cable 608 to gate 610, which is also now opened at SP1-1 by OR 609. This enters the priority of node 5 with respect to this data set in the current priority register 614. Each of the other nodes will have a comparable gate connected to its respective priority field.

The pulse SP1-2 operates OR 619 (FIG. 3M) to open gate 620 to gate the decoded sender address (node 1 in the example) from decoder 622 to cable 622 to open gate 596 (FIG. 3K) which is assigned to the priority field of node 1. This gates node 1's priority to cable 608 to FIG. 3R and gate 612 which is now opened by OR 611 at SP1-2. The priority for node 1 is now entered in the previous priority register 616. The contents of the two priority registers are compared in comparator 625, which produces a "higher than" or "lower than" output. Gate 626 opened by OR 627 gates out the previous priority which is greater than the current priority to line 272, which returns the routine to OA-5.

If the current priority (of node 5) is greater than the previous priority (node 1), as we have assumed, AND 631 potentialized by SP1-3 renders line 275 hot. Line 275 operates OR 397 (FIG. 3U) to initiate the send prepare sub-routine by firing single shot 400. This operation has previously been described. Node 5 now sends SP commands to nodes 1, 3, and 6.

When the SP command is received by node 1, it operates under control of the receive message (RM) routine to fetch the control word from memory and enter it in the memory data register. This control word has node 1 in the 1 state since that node had previously sent out its own SP command. Therefore, the SP command from node 5 and the 1 state, when combined in the AND matrix, will energize the AP1 line to activate the AP1 sub-routine. Node 1 will now measure the priority of node 5 with respect to itself and, finding node 5 to be dominant, will return an AP acknowledgement.

If, however, node 1 has received all of its AP acknowledgements from nodes 3, 5, and 6 before it receives the SP command from node 5, then the check off procedure, previously described with respect to the receive AP sub-routine, will activate the SU (send update) sub-routine to initiate and transmit (by means of the TM routine) the SU commands to nodes 3, 5, and 6. The initiation of the SU sub-routine will set the state of node 1 to 2. Thus, on FIG. 30, the belated receipt of the SP command at node 1 will activate the P2 line in the AND matrix, which is a "no operation" signal to OR 368 (FIG. 3V) to return the node to the OA-5 control, or "listen for message" condition.

Once any node has achieved state 2, it has very circumscribed alternatives. A master node can send only SU or SX commands while in state 2. A slave node will process only SX commands. A master node will receive and process only AU acknowledgements. All other commands or acknowledgements received while a node is in state 2 will result in a "no operation."

While the invention has been particularly shown and disclosed with reference to a preferred embodiment thereof, it will be understood by those skilled in the art, that various changes in form and detail may be made therein without departing from the spirit and scope of the invention.

What is claimed is:

1. In a network having a plurality of independently operating data processing units disposed at a plurality of discrete nodal positions and interconnected by a data communication link, each said unit having a memory storing a plurality of data sets, predetermined ones of which are stored at a plurality of units in the network for local independent use thereat, the improvement comprising,
   a. means at each of said nodal locations for storing indicia manifestive of the nodal storage locations of each respective multiply-stored data set;
   b. means at each of said nodal locations operated responsive to a locally generated update signal for a given data set, and under control of said stored indicia, for initiating and transmitting updating orders to all other nodal units storing the given data set; and
   c. means at each of said nodal locations operated responsive to updating orders addressed to it for updating the given data set in its own associated memory.

2. The apparatus of claim 1 wherein there is additionally provided at each nodal location logic means operatively connected to said data communication link and to said means operated responsive to updating orders addressed to it for rendering one only of a plurality of competing orders from different sources to update the same data set effective to control the updating of the multiply-stored data set.

3. The apparatus of claim 1 wherein there is additionally provided at each nodal location means operative responsive to an update request from its associated data processing unit for initiating a command to all other nodal locations storing the given set of multiply-stored data to prepare to update that data set, and means at each nodal location operative responsive to said command for resolving any conflicts between that command and commands from other nodal locations prior to permitting the actual updating of the data.

4. The apparatus of claim 2 wherein there is additionally provided at each nodal location storage means for storing indicia manifestive of the priority which each nodal unit has to update each respective set of multiply-stored data, the said storage means being operatively connected to and controlled by said logic means to deliver the stored priority indicia to said logic means to enable it to control the selection of the updating order having the highest priority for control of the updating.

5. The apparatus of claim 4 including means at each nodal unit operative responsive to the occurrence of two successive commands to update the same data set under control of said priority indicia to respond only to the commands from the nodal unit having the higher priority.

6. The apparatus of claim 4 including means at each said nodal unit operative responsive to the occurrence of a locally generated update signal and externally initiated commands to update the same data and under control of said priority indicia to execute the external command only if the initiating node has a higher priority than the local node with respect to that data set.

7. The apparatus of claim 4 including means at each said nodal unit operative responsive to the occurrence of a locally generated update signal and externally initiated commands to update the same data set and under control of said priority indicia to initiate and transmit updating commands to the data-sharing nodal units only if the local node has a higher priority than the external nodal unit.

8. Apparatus for controlling the updating of sets of data which are stored in a plurality of data processing units interconnected by a data communication link in a data communication network having a plurality of nodal locations; comprising
   a. node location storage means at each of said nodes storing indicia manifestive of the storage location of each respective set of multiply-stored data;
   b. priority storage means at each of said nodes storing indicia manifestive of the priorities of each of the data-sharing nodes for updating each respective multiply-stored data set;
   c. means at each said nodal location connected to said communication line and operative responsive to a data update request from its associated data processing unit and under control of the indicia in said node location storage means for transmitting data updating commands on said communication link addressed to the apparatus at the other nodes sharing a given data set;
   d. means at each of the nodal locations connected to said communication link and operative responsive to updating commands addressed to it, and operative under control of said priority storage means to execute commands from a node having the highest priority.

9. The apparatus of claim 8 wherein each node includes comparing means for comparing its own priority with the priority of an incoming command with respect to the same data set, and operative responsive to said comparing means to transmit updating commands if the incoming command is of a lower priority than its own, the said comparing means being operatively connected to said priority storage means to receive therefrom under control of the incoming command the priority indicia manifestive of the priority of the nodal unit initiating the incoming command and of the receiving nodal unit with respect to the same data set and producing a signal manifestive of the relative values thereof for controlling the transmission of the command having the higher priority.

10. The apparatus of claim 9 wherein there is further provided at each node:
   a. means connected to said data communication link and operative responsive to a command addressed to it to transmit an acknowledgement to the commanding node;
b. means connected to said communication link and to said node location storage means for checking for the the presence of acknowledgements from all nodes to whom commands were addressed; and
c. means responsive to the checking means for transmitting data to the nodes only after all acknowledgements have been received.

11. The apparatus of claim 8 wherein said location storage means and said priority storage means comprises an addressable memory having a storage word position for each multiply-stored data set, said word storage position also including storage positions for checking off the receipt of acknowledgements from the addressed nodes.

12. In a network of data processing equipment disposed at a plurality of nodal locations and interconnected by a data communication link wherein given sets of data are multiply stored at a plurality of said nodal locations, the improvement comprising;
means at each of said nodal locations for initiating and transmitting commands to all those nodal locations, including itself, storing a given set of data to update that data set;
means at each of said nodes operative responsive to an updating command to update the given set of data in its own facility; and
priority resolving means at each of said nodal locations operative responsive to the receipt of competing commands to update the same given data set to execute the command having the higher priority.

13. The apparatus of claim 12 wherein said priority resolving means comprises a memory storing indicia manifestive of the priority possessed by each nodal location to update each set of multiply stored data.

* * * * *